US007588198B2

(12) United States Patent
Hornsby et al.

(10) Patent No.: US 7,588,198 B2
(45) Date of Patent: Sep. 15, 2009

(54) POWER SPRAYER

(75) Inventors: James Russell Hornsby, St. Louis, MO (US); Marcellus Rambo Benson, Chesterfield, MO (US); James Augustus Keefe, III, O'Fallon, MO (US); Joseph Lee McGowan, St. Charles, MO (US)

(73) Assignee: S.C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 10/915,954

(22) Filed: Aug. 9, 2004

(65) Prior Publication Data

US 2005/0133624 A1 Jun. 23, 2005

Related U.S. Application Data

(63) Continuation-in-part of application No. 10/863,817, filed on Jun. 8, 2004, now Pat. No. 7,328,859, which is a continuation-in-part of application No. 10/832,682, filed on Apr. 27, 2004, now Pat. No. 7,097,119.

(60) Provisional application No. 60/530,869, filed on Dec. 18, 2003.

(51) Int. Cl.

| | |
|---|---|
| ***A62C 13/62*** | (2006.01) |
| ***A62C 13/66*** | (2006.01) |
| *B65D 88/54* | (2006.01) |
| *G01F 11/00* | (2006.01) |

(52) U.S. Cl. ....................... 239/308; 239/146; 239/337; 239/333; 239/322; 222/158; 222/333; 222/471

(58) Field of Classification Search ................. 239/329, 239/331-33, 332, 333, 337, 340, 347, 348, 239/463, 464, 469, 471, 526, 527; 222/372, 222/382, 383.1, 380, 333, 479, 154, 158; 137/625.33, 625.28

See application file for complete search history.

(56) References Cited

U.S. PATENT DOCUMENTS

| | | | |
|---|---|---|---|
| 2,117,747 | A | 5/1938 | Smith et al. |
| 2,704,690 | A | 3/1955 | Eichenauer |
| 3,137,326 | A | 6/1964 | Welty et al. |

(Continued)

FOREIGN PATENT DOCUMENTS

| | | |
|---|---|---|
| EP | 0 593 900 A2 | 4/1994 |

(Continued)

OTHER PUBLICATIONS http://www.solousa.com, 3 pages, Nov. 2004, "Chemical Applicators: Backpack Sprayers".

(Continued)

*Primary Examiner*—Len Tran
*Assistant Examiner*—James S Hogan

(57) ABSTRACT

The present invention is a dispenser adapted to be coupled to a fluid container. The dispenser comprises a dispensing head, an energy source, and a fluid pathway. The dispensing head includes a fluid pump, a motor adapted to power the pump, a trigger adapted to control the motor, and a nozzle orifice in fluid communication with a discharge end of the pump. The fluid pathway has one portion in fluid communication with an intake end of the pump and another portion inside the container.

9 Claims, 23 Drawing Sheets

U.S. PATENT DOCUMENTS

| | | | | |
|---|---|---|---|---|
| 3,445,068 A | | 5/1969 | Wagner | |
| 3,490,656 A | | 1/1970 | Taschner | |
| 3,667,655 A | | 6/1972 | Knierien, Jr. | |
| 3,904,116 A | | 9/1975 | Jones et al. | |
| 3,967,765 A | | 7/1976 | Micallef | |
| 3,993,250 A | | 11/1976 | Shure | |
| 4,020,979 A | | 5/1977 | Shay et al. | |
| 4,153,203 A | | 5/1979 | Tada | |
| 4,154,375 A | | 5/1979 | Bippus | |
| 4,162,037 A | | 7/1979 | Koyama | |
| 4,182,496 A | | 1/1980 | Burke | |
| 4,187,959 A | | 2/1980 | Pelton | |
| 4,189,098 A | | 2/1980 | Wagner et al. | |
| 4,204,614 A | | 5/1980 | Reeve | |
| 4,234,128 A | | 11/1980 | Quinn et al. | |
| 4,239,129 A | | 12/1980 | Esposito | |
| 4,260,079 A | | 4/1981 | Cary et al. | |
| 4,273,290 A | | 6/1981 | Quinn | |
| 4,393,993 A | | 7/1983 | Kille et al. | |
| 4,516,695 A | | 5/1985 | Garneau | |
| 4,618,099 A | | 10/1986 | Nagao et al. | |
| 4,621,770 A | | 11/1986 | Sayen | |
| 4,706,888 A | | 11/1987 | Dobbs | |
| 4,767,033 A | | 8/1988 | Gemperle | |
| 4,830,235 A | | 5/1989 | Miller | |
| 4,881,687 A | | 11/1989 | Ballu et al. | |
| 4,925,105 A | | 5/1990 | Lin | |
| 5,014,884 A | | 5/1991 | Wunsch | |
| 5,069,365 A | | 12/1991 | Woodhouse | |
| 5,078,188 A | | 1/1992 | Nitzberg et al. | |
| 5,147,074 A | | 9/1992 | Battegazzore | |
| 5,147,292 A | | 9/1992 | Kullas et al. | |
| 5,150,841 A | * | 9/1992 | Silvenis et al. | 239/332 |
| 5,154,317 A | * | 10/1992 | Roppolo, III | 222/66 |
| 5,156,304 A | | 10/1992 | Battegazzore | |
| 5,184,756 A | | 2/1993 | Amron | |
| 5,195,664 A | | 3/1993 | Rhea | |
| 5,215,227 A | | 6/1993 | Farner | |
| 5,360,153 A | * | 11/1994 | Cooper | 227/67 |
| 5,364,111 A | | 11/1994 | Wunsch | |
| 5,397,034 A | | 3/1995 | Wunsch | |
| 5,427,274 A | | 6/1995 | Wood | |
| 5,499,766 A | | 3/1996 | Foster et al. | |
| 5,549,249 A | | 8/1996 | Foster et al. | |
| 5,590,837 A | | 1/1997 | Grogan | |
| 5,605,496 A | | 2/1997 | Pickard | |
| 5,657,907 A | | 8/1997 | Dobbs et al. | |
| 5,716,007 A | | 2/1998 | Nottingham et al. | |
| 5,769,325 A | | 6/1998 | Jouillat et al. | |
| 5,873,500 A | * | 2/1999 | Homburg et al. | 222/608 |
| 5,878,925 A | * | 3/1999 | Denkins et al. | 222/608 |
| 5,964,377 A | | 10/1999 | Demarest et al. | |
| 6,022,473 A | * | 2/2000 | Mickelson | 210/86 |
| D423,934 S | | 5/2000 | Brozell | |
| 6,070,808 A | * | 6/2000 | Kildow | 239/146 |
| D442,088 S | | 5/2001 | Trepina et al. | |
| 6,227,412 B1 | | 5/2001 | Sweeton | |
| 6,260,722 B1 | * | 7/2001 | Ekkert | 215/331 |
| D454,778 S | | 3/2002 | Siebert et al. | |
| D454,779 S | | 3/2002 | Siebert et al. | |
| 6,478,196 B2 | | 11/2002 | Fuchs | |
| 6,502,766 B1 | * | 1/2003 | Streutker et al. | 239/332 |
| 6,554,211 B1 | | 4/2003 | Preuter et al. | |
| 6,595,437 B1 | * | 7/2003 | Lawson et al. | 239/119 |
| 6,658,779 B2 | * | 12/2003 | Bauer et al. | 42/1.08 |
| 6,663,307 B2 | * | 12/2003 | Kopanic et al. | 401/190 |
| 6,669,061 B2 | * | 12/2003 | Tada | 222/383.1 |
| 6,752,330 B2 | | 6/2004 | DiMaggio et al. | |
| D494,866 S | | 8/2004 | Guala | |
| D495,399 S | | 8/2004 | Guala | |
| 6,910,605 B2 | | 6/2005 | Schuckmann et al. | |
| 6,945,438 B1 | * | 9/2005 | Shih et al. | 222/608 |
| 7,011,521 B2 | | 3/2006 | Sierro et al. | |
| 7,021,399 B2 | | 4/2006 | Driessen | |
| 2003/0052194 A1 | | 3/2003 | Streutker et al. | |
| 2005/0082389 A1 | * | 4/2005 | Sanchez et al. | 239/332 |
| 2005/0098577 A1 | * | 5/2005 | Huy et al. | 222/79 |
| 2005/0133624 A1 | | 6/2005 | Hornsby | |
| 2005/0189381 A1 | | 9/2005 | Tsuchida | |
| 2005/0194467 A1 | | 9/2005 | Wangaugh et al. | |

FOREIGN PATENT DOCUMENTS

| | | |
|---|---|---|
| EP | 1 013 345 A2 | 6/2000 |
| WO | WO 96/18572 A | 6/1996 |

OTHER PUBLICATIONS http://www.solousa.com, 1 pages, Nov. 2004, “Chemical Applicators: Handheld Sprayers”.

Saint-Gobain Calmar Inc., Copyright 2004, “PS2003 Ready to Use Power Sprayer”, 2 pages.

* cited by examiner

SWITCH SHORT

SWITCH OPEN

POWER SPRAYER

CROSS-REFERENCE TO RELATED APPLICATION

This application is a continuation-in-part of U.S. continuation-in-part patent application Ser. No. 10/863,817, filed Jun. 8, 2004, which is a continuation-in-part of U.S. non-provisional patent application Ser. No. 10/832,682, filed Apr. 27, 2004, and it claims priority thereto and to U.S. provisional patent application Ser. No. 60/530,869, filed Dec. 18, 2003, both of which are incorporated herein by reference in their entirety.

BACKGROUND

The present invention relates to devices and methods for dispensing substances. More particularly, the present invention relates to devices and methods for dispensing fluids and to a powered dispenser for attachment to a reservoir containing a fluid to be dispensed.

Hand operated sprayers are often mounted on containers of household liquids such as window and bathroom cleaners or ARMOR ALL®. A household liquid is dispensed from the hand-operated sprayer by repeatedly squeezing a lever on the sprayer. This can be tiresome. Consequently, powered sprayers have been previously developed to replace the hand-operated sprayers.

These previous powered sprayers suffer from several drawbacks. First, they often cannot be mounted on an off-the-shelf container of household liquid, instead relying on a special reservoir that must be refilled by the user. This can be messy and/or inconvenient for a user.

Second, the previous powered sprayers have spray heads or housings that are substantially larger and heavier than the standard hand operated sprayers. As a result, the previous powered sprayers tend to be top heavy and unwieldy. They tend to be expensive in comparison to non-powered sprayers and, for at least these reasons, are not optimally marketable.

There is a need in the art for a powered sprayer that has a spray head or housing that is similar in size and configuration to a standard hand operated sprayer.

SUMMARY

The present invention, in one embodiment, is a sprayer comprising a motorized liquid spray head or spray pump assembly. It includes an operating mechanism adapted to provide the user a push button actuated, automatic power spray for any of a variety of generally liquid or fluid materials. Examples of material that can be dispensed or sprayed by the power sprayer of the present invention include cleaning substances such as glass cleaner and the like. The present invention may also be used to spray or mist items with water, and it can be used to dispense insecticides, fungicides or the like. It also may be used for a wide range of other products or substances, e.g., sunscreens, liquid cleaners, disinfectants, herbicides, virtually any substance which can be dispensed, applied or used in a spray, atomized, vapor, stream, aerosol, or mist form.

In one embodiment, the sprayer of the present invention comprises a housing or attachment designed to fit typical, common bottles or other containers for containing substances. An example of such a container is the type used to contain common window cleaner. The sprayer, particularly the nozzle, of the present invention may be adjustable from a fine mist to a strong, and in some embodiments, generally coherent stream.

In one embodiment, the present invention comprises a dispenser adapted to be coupled to a fluid container. The dispenser comprises a dispensing head, an energy source, and a fluid pathway. The dispensing head includes a fluid pump, a motor adapted to power the pump, a trigger adapted to control the motor, and a nozzle orifice in fluid communication with a discharge end of the pump. The fluid pathway has one portion in fluid communication with an intake end of the pump and another portion inside the container.

In one embodiment, the invention includes a pick up tube, disposed inside the container or bottle to which the sprayer is attached, that is weighted and sufficiently flexible to allow the power sprayer to work at any angle and upside down.

In one embodiment, the weight at the end of the pick-up tube may be a die cast or brass weight with a slot in the end. The slot keeps the intake associated with the weight from being blocked or shut off against the side of the bottle. In one embodiment, the pick up tube to which the weight is attached is a very flexible silicon or like material, although any material may be selected as long as it is sufficiently flexible. The length of the pick up tube should be selected so it doesn't get caught or tangled.

In one embodiment, the present invention comprises a battery operated liquid spray pump which may be used interchangeably on typical containers or bottles for a variety of substances. The spray pump of the present invention may be used for a variety of purposes. For example, in the home, cleaning solutions such as window cleaners may be sprayed or dispensed with it. In the garage, for automotive uses, various cleaning materials may be dispensed or applied using the sprayer of the present invention. In the garden, the present invention may be used for spraying or dispensing insecticides, herbicides or for misting plants. It may be used in a wide variety of applications or uses at home or on the job, anywhere hand-pumped sprayers are currently in use.

In one embodiment, the pump unit or sprayer of the invention has two batteries (as many batteries as suitable may be used) that are housed inside the container or bottle neck in a tube-like housing when the sprayer of the invention is attached to a bottle or container. In other embodiments, other suitable power sources (e.g., a capacitor, capacitors, etc.) may be used.

In one embodiment, the sprayer of the present invention comprises a trigger, for example, a push button type trigger, that turns on a motorized pumping system, bringing the liquid to the sprayer nozzle under pressure and producing an adjustable spray mist. The trigger permits on/off fingertip control. The user simply touches or depresses the button when the spray is desired; release the button and the spray stops. In one embodiment, a weighted in-bottle pick up tube allows for any angle spraying.

In one embodiment, the sprayer unit of the present invention is designed to fit any standard cleaner bottle, but it may also comprise an empty bottle that the user can fill and use to dispense substances.

In some embodiments, a small funnel may be provided. Other features of the present invention may include a nozzle which is adjustable from a fine mist to a strong, substantially coherent stream. The attachment feature of the spray head unit of the present invention should be adapted to fit a typical standard size bottle or container, and in some embodiments, it may be adapted to be adjusted to containers with openings of various sizes. In one embodiment, the attachment feature or connector is a threaded adapter piece. The electrical system associated with the present invention should be water resistant whereby components should not rust or corrode due to contact with water or chemicals, including cleaning agents or soap. In one embodiment, the present invention comprises a motorized piston pump and nozzle for attaching to a container whereby the contents of the container may be dispensed. In other embodiments, the present invention may comprise a gear pump or other suitable pumping mechanism.

In one embodiment, the present invention comprises a dispensing attachment for mounting on or to a container containing a substance to be dispensed wherein the dispenser comprises a power source, e.g., batteries, a motor, a operating mechanism, a pump, a nozzle, and a pick up tube.

In some embodiments, the present invention includes a safety lock, which can comprise any suitable method for an operator to conveniently and easily lock and unlock the trigger or operating button of the invention. In one embodiment, this may comprise a safety lockout lever or slide type button. In some embodiments, the invention may be made available with a child safety cap.

In one embodiment, the present invention comprises a motorized spray unit comprising a motor, a piston pump, a flex weighted liquid draw or pick up tube, a battery housing and an adjustable nozzle. Suitable liquid conduits may be used to connect the liquid conducting portions of the invention and to provide a flow path. In one embodiment, the present invention uses a simple trigger or push button actuation switch to replace the manual pump and pump trigger or operating mechanisms typically found on such sprayers, and allows the user to spray without excessive finger or hand pumping or flexion. In some embodiments, the switch may be an "on/off" switch having two states. In other embodiments, a variable speed switch arrangement may be used. Such an arrangement may incorporate microprocessor, rheostatic or other suitable control components.

An advantage of the spray head of the present invention is that the batteries, or other suitable power source, fit inside the neck of the bottle when the spray head is attached to a bottle, whereby convenience, comfort, handling and use of the invention are balanced and facilitated.

In one embodiment, the entire pump unit including its handle portion and the battery unit which extends inside the bottle, should be adapted to be pivotal around a screw-on cap as one piece. This facilitates installing the spray head on a bottle or other container.

In one embodiment, the nozzle is rotatable between selected dispensing configurations including spray and stream. The nozzle, and/or the sprayer, may be adapted to provide indications, graphically or otherwise, of these and/or other operable conditions. In some embodiments, the sprayer may be adapted, by incorporating suitable electronic components to provide sensing and indicating features, and/or electronic control features, e.g., adjustable, rheostatic output pressure control. For example, the sprayer could sense and display dispensing pressure, contents remaining, etc. It could also be adapted to provide a visual signal of operating states, e.g., battery capacity remaining, by providing a suitable light source, e.g., a bulb, LED, etc. It could also be adapted to provide other types of signals, e.g., visual, tactile, audible, etc. to users or potential purchasers.

In one embodiment, the present invention comprises a powered, motorized spray pump head including a battery housing, batteries, a straw-like liquid draw or pick-up tube, a soft flexible tube, a pump, a motor and gear assembly, safety lockout tab, a primer chamber, a multiple position nozzle, a trigger contact switch, a trigger and a weighted pick-up tube. Note that the safety lock tab may be adapted to interrupt the power supply and/or physically permit or not permit positioning or depression of the trigger.

The components of the present invention are appropriately housed in or extend from a housing which may be formed of a number of connected pieces, or which may be formed as a single piece.

In one embodiment, the present invention comprises a housing for containing or mounting the operable components and features of the present invention. At the outlet end of the housing, the invention includes a cap of a nozzle which provides for adjustment of the spray. An internal washer and rubber washer are provided for sealing purposes, and an axial cover is provided to close the end. The invention provides a fluid pathway in the housing which includes a first one-way valve, a suitable connector tube and a second one-way valve. One end of the second one-way valve is coupled to a piston housing which contains a piston ring and rod for reciprocating motion. The piston ring and rod are operably coupled to a gear box containing a gear, in turn driven by a motor. These components are suitably housed in the cover or housing. The housing is adapted to carry a threaded, cap-like structure for connection to the neck of a bottle or other container. A battery tube or housing extends generally from the underside of the cover through the cap portion. This provides a water or liquid proof housing for a required number of batteries.

On the intake side, the present invention comprises an absorbent tube carrying at one end a plastic ring and tube connector. A push button trigger is associated with the housing, and a safety lock is operably coupled to the housing whereby it can affect the function of the trigger.

A suitable valve or flow control arrangement is provided for pressure equalization, using, for example, a suitable one way valve or valves.

In one embodiment, the present invention comprises a hand held spray gun and supply unit comprising a housing with a hand grip portion, a pump assembly mounted in the housing including a pump and a nozzle, the pump comprising a cylinder with an intake and a piston mounted in the cylinder to pump fluid from the intake through the nozzle. An electric motor is mounted in the housing, and batteries are within a special container associated with the housing. A switch on a face of the housing adjacent to the hand grip is provided for actuating or operating the motor and, therefore, the pump, and a tube depends from the housing into the container for supplying liquid from the container to the intake for discharge through the nozzle.

The present invention, in another embodiment, is a dispenser adapted to couple to a fluid container having an opening surrounded by a neck. The dispenser comprises a cap, a dispensing head, an energy source, and a conduit. The cap is adapted to seal the opening fluid tight when the dispenser is coupled to the container. The dispensing head is pivotably secured to the cap and includes a fluid pump, a motor adapted to power the pump, a trigger adapted to actuate the motor, and a nozzle orifice in fluid communication with a discharge end of the pump. The energy source is electrically connected to the motor and extends inside the container. The conduit has a first end in fluid communication with an intake end of the pump and a second end inside the container. In some embodiments, the energy source (e.g., batteries, capacitors, etc.) may be located adjacent to the caps without extending or only slightly extending into the container.

The present invention, in another embodiment, is a dispensing attachment for coupling to a container containing a substance to be dispensed. The dispensing attachment comprises a motor, an actuating mechanism adapted to actuate the motor, a pump driven by the motor and including an intake end and a discharge end, a housing enclosing the motor and pump, a nozzle in fluid communication with the discharge end of the pump, and a generally flexible pick-up tube. The generally flexible pick-up tube has a first end and a second end. The first end is in fluid is in fluid communication with the intake end of the pump. The second end is free and carrying a weight formed of a corrosion and rust resistant material.

The present invention, in another embodiment, is a sprayer for dispensing a fluid. The sprayer includes a fluid container and a motor operated pump. The motor operated pump includes a pump cylinder, a fluid pathway, and a venting arrangement. The fluid pathway operably connects the container, the pump and a discharge opening. The venting arrangement includes a first vent and a second vent associated with the pump cylinder. The first vent is adapted to allow air into the cylinder and the second vent is in fluid communication with the container, generally opposite to the first vent, and adapted to allow air and excess fluid into the container.

One potential problem with motorized pump sprayers is that when an operator of such a sprayer releases the actuating mechanism or trigger to stop spraying, liquid or fluid being dispensed may continue to flow or dribble from the nozzle. One cause may be that the piston happens to be moving forward in the cylinder when the user decides to release the trigger. Inertia inherent in the drive mechanism, e.g., piston, piston rod, etc., gradually slows down against friction and fluid pressure, instead of stopping precisely as desired when the trigger is released. Thus, the problem is that fluid delivered to the pump cylinder continues to flow or dribble from the nozzle even after the operator's intention is to stop it by releasing the trigger. This becomes messy and/or inconvenient since the fluid stream or spray does not entirely land on the intended surface or target and may instead get on materials or surface for which the fluid or liquid is not intended, perhaps causing damage. Furthermore, this problem is wasteful and costly since more fluid will be needed to spray to complete a job. In some uses or applications of motorized pump sprayers, for example, when the user is spraying poisons or caustic fluids where precise application is important to avoid burning skin or other items, this dribble or drip problem can become dangerous.

In motorized sprayers, there may be an air bubble in the fluid in the pump cylinder under compression. This compressed air exacerbates the drip problem by providing a propellant pressure so that even after the piston is stopped at its top dead center position, fluid may continue to drip or flow from the nozzle.

In motorized sprayers, such as that of the present invention and others, it would be advantageous to keep the motor running until the piston has actually just begun its return or suction stroke, thus generating negative pressure in the cylinder, at which time the electrical supply to the motor is interrupted or stopped.

In one embodiment, the present invention comprises an "anti-dribble" feature for sprayers. In one embodiment, the anti-dribble feature comprises a switching circuit or arrangement that acts to prevent fluid from continuing to flow from the nozzle of the sprayer after a user has released the actuating mechanism or trigger to stop spraying. Thus, an advantage of the present invention is that addresses or avoids dribbling by using an economical positioning, timing or delay switching circuit.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 15, including

DETAILED DESCRIPTION

The present invention is a novel and advantageous handheld power sprayer that has a motorized means for pumping a fluid from a reservoir containing the fluid. As will be understood from this detailed description, the power sprayer of the present invention has a configuration that allows it to more closely resemble the size, appearance and feel of standard hand operated sprayers. Thus, the power sprayer of the present invention is easier to hold and less fatiguing to use as compared to prior power sprayers.

Figure 1:
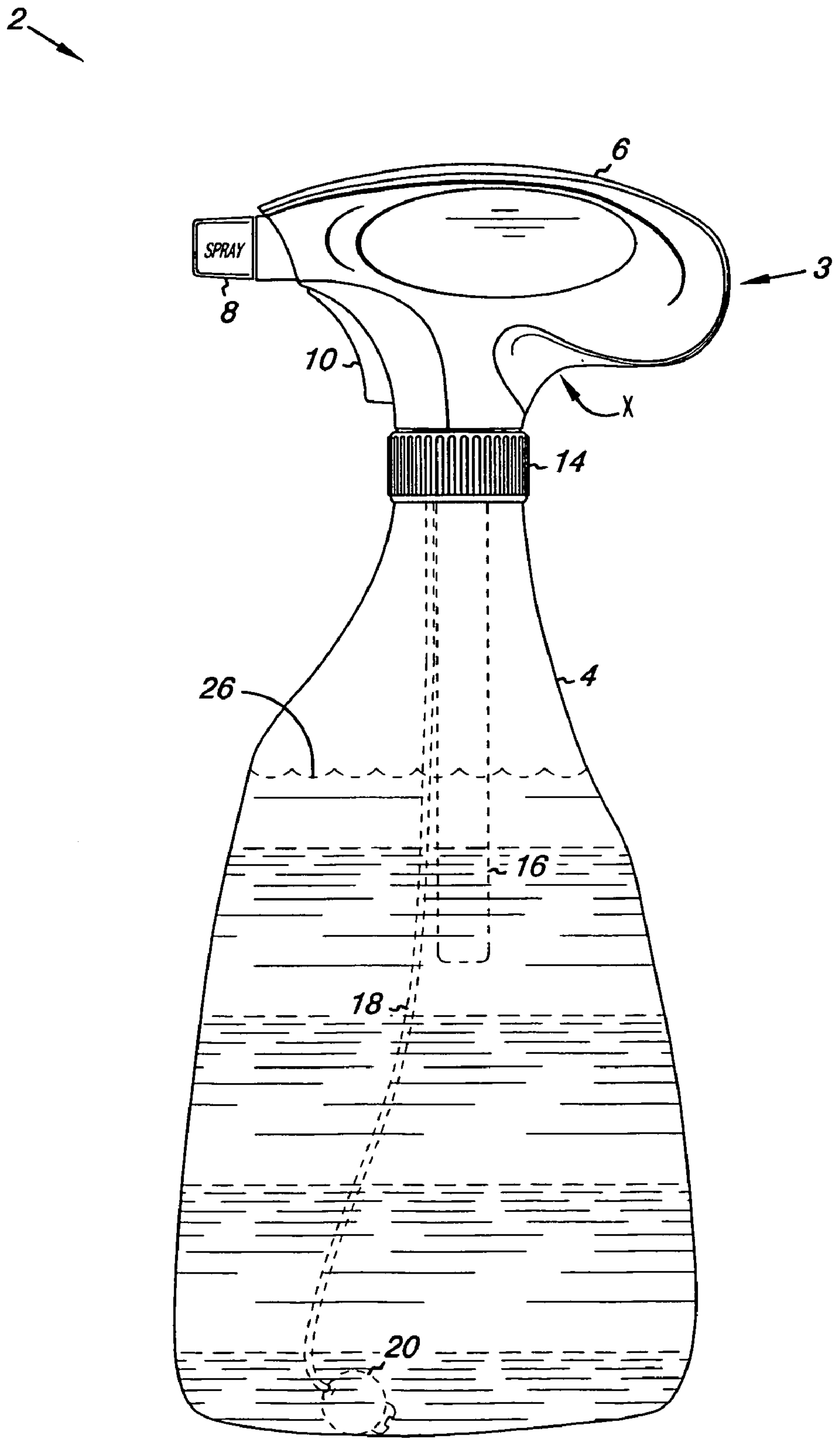
FIG. 1 is an elevation view of the non-safety lock side of the handheld power sprayer of the subject invention mounted on a reservoir adapted to contain a fluid.

FIG. 1 is an elevation view of the non-safety lock side of the handheld power sprayer 2 of the subject invention mounted on a reservoir 4 (i.e., a container of common household, garage or gardening liquid such as bathroom cleaner, window cleaner, ARMOR ALL®, fungicides, herbicides, pesticides, water, etc.). As shown in FIG. 1, the power sprayer 2 includes a spray head 3, a cap 14, a battery tube 16, and a flexible intake tube 18 with a weight 20. When the sprayer 2 is mounted on the reservoir 4, the spray head 3 and cap 14 are located outside the reservoir 4, while the battery tube 16, flexible intake tube 18, and weight 20 are located inside the reservoir 4.

Figure 2:
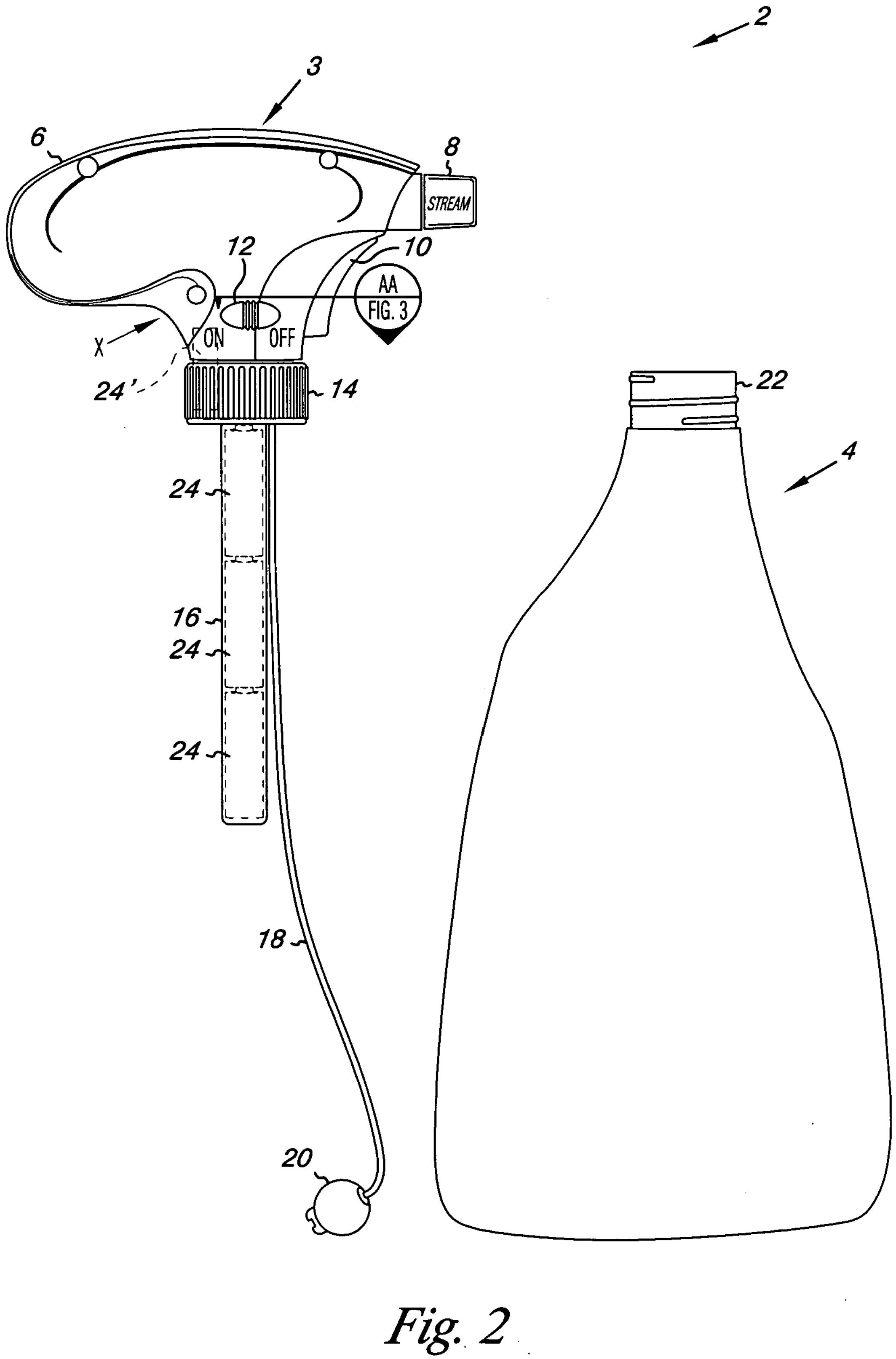
FIG. 2 is an elevation view of the safety lock side of the handheld power sprayer and the reservoir wherein the sprayer is not mounted on the reservoir.

FIG. 2 is an elevation view of the safety lock side of the handheld power sprayer 2 and the reservoir 4 wherein the sprayer 2 is not mounted on the reservoir 4. As shown in FIG. 2, the spray head 3 includes a housing 6, a nozzle cap 8, a trigger 10, and a safety lock 12.

As can be understood from FIGS. 1 and 2, the housing 6 is ergonomically contoured such that the portion of the hand between the thumb and forefinger abuts against contoured portion X while the forefinger is positioned to depress the trigger 10. The housing 6 contains the spraying mechanism of the sprayer 2.

As indicated in FIG. 2, the reservoir 4 has an opening surrounded by a neck 22 with male threads. As shown in FIG. 1, the cap 14 connects the sprayer 2 to the reservoir 4 via female threads adapted to mate with the male threads of the neck 22. The cap 14 is adapted to be compatible with most containers 4 used to hold common household, garage and garden liquids. However, in one embodiment, one or more adapters are provided with the sprayer 2 to facilitate the sprayer's connection to the necks 22 of most, if not all, containers 4.

In one embodiment, the spray head 3 is pivotably attached to the cap 14 such that the spray head 3 may freely pivot 360° about a vertical axis passing through the center point of the neck 22. This eases the attachment of the sprayer 2 to the neck 22 of the reservoir.

The trigger 10 is used to actuate the sprayer 2. As indicated in FIGS. 1 and 2, in one embodiment, the power sprayer 2 is actuated by partially displacing the trigger 10 into the housing 6.

Figure 3:
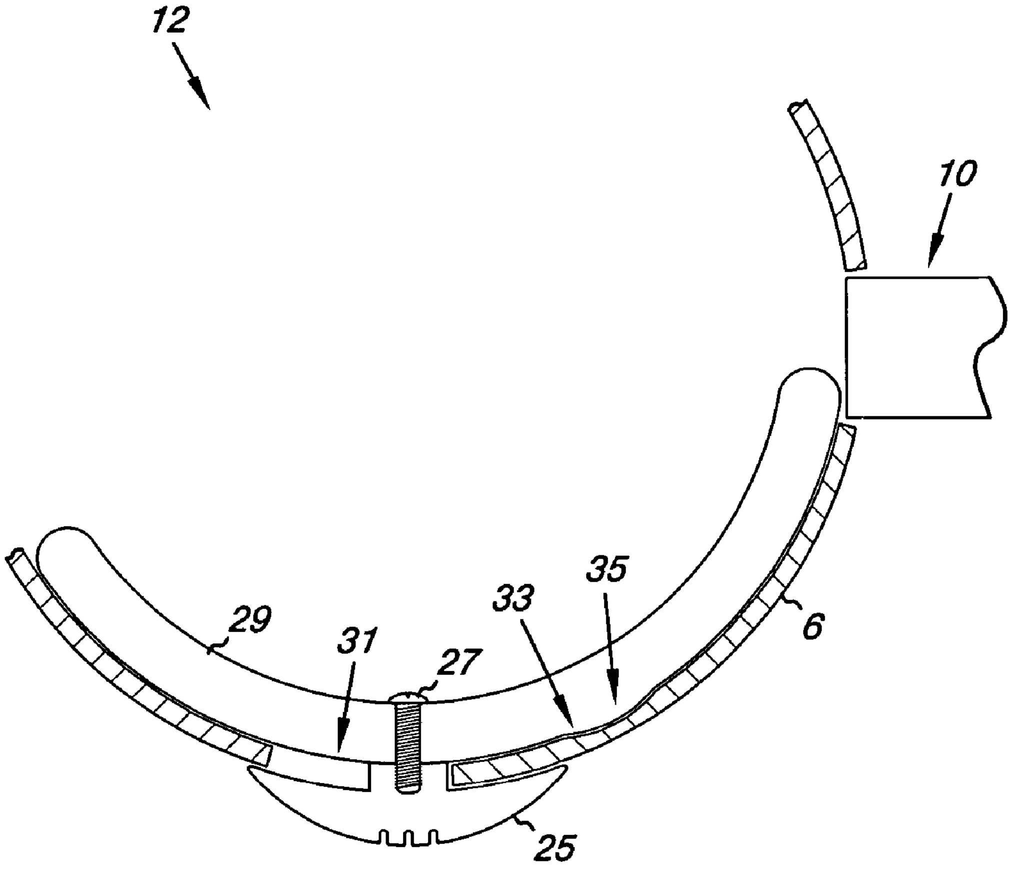
FIG. 3 is a plan view of the safety lock in the off position as taken along section line AA in FIG. 2

As illustrated in FIG. 2, in one embodiment, the safety lock 12 is horizontally displaceable along the housing 6 between a position marked "OFF" and a position marked "ON." As shown in FIG. 3, which is a plan view of the safety lock 12 in the off position as taken along section line AA in FIG. 2, when the safety lock 12 is slid into the off position, which is closer to the trigger 10 than the on position, the safety lock 12 prevents the trigger 10 from displacing into the housing 6. Thus, when the safety lock 12 is in the off position, the power sprayer 2 cannot be actuated via the trigger 12. Conversely, when the safety lock 12 is in the on position, the trigger 10 may be displaced into the housing 6 to actuate the power sprayer 2.

As illustrated in FIG. 3, the safety lock 12 includes a slide button 25 attached by a screw 27 to a block 29. The housing 6 is sandwiched between the button 25 and block 29 and has a slot 31 through which the button 25 extends to join the block 29. The slot 31 is sufficiently long to allow the safety lock 12 to slide into or out of engagement with the trigger 10. The block 29 has a bump 33 that mates with a depression 35 in the housing 6. The bump 33 and depression 35 serve to positively maintain the safety lock 12 in the off position and to provide a click sound to indicate engagement of the safety lock 12.

In other embodiments, the sprayer 2 may employ other safety measures for preventing unintentional discharge from the sprayer 2. These safety measures may include other mechanical means for locking and unlocking the trigger 10 of the sprayer 2, means for preventing the completion of the electrical circuit powering the sprayer 2, and/or a child-proof safety cap for placement on the nozzle cap 8.

As indicated in FIGS. 1 and 2, the nozzle cap 8 is pivotally attached to the housing 6 and allows a user to select between a spray or stream-type application of the fluid. In one embodiment, the nozzle cap 8 has four sides and each side could have a word or other indicia on it, such as "SPRAY" or "STREAM." In some embodiments other indicators, words or indicia, e.g., the word "OFF" could be used on one of the sides. To select a stream-type application (i.e., the liquid flow from the nozzle cap 8 is a strong, generally coherent stream), the nozzle cap 8 is pivoted until a side of the nozzle cap 8 with the word "STREAM" is facing upwards. Similarly, to select a spray-type application (i.e., the liquid flow from the nozzle cap 8 is a generally fine mist), the nozzle cap 8 is pivoted until a side of the nozzle cap 8 with the word "SPRAY" is facing upwards. In embodiments including an off setting, when the nozzle cap 8 is pivoted until a side of the nozzle cap 8 with the word "OFF" is facing upwards, the nozzle cap 8 will be shut off and no flow will be able to emit from the nozzle cap 8.

As shown in FIG. 1, when the sprayer 2 is mounted on a reservoir 4, the battery tube 16 extends from the cap 14 down into the reservoir 4. In one embodiment, as indicated in FIG. 2, the battery tube 16 contains three AAA batteries 24 that may be replaced when depleted. In other embodiments, the battery tube 16 may include a greater or lesser number of batteries 24. Also, the batteries 24 may be other sizes, such as AA. To allow the replacement of the batteries 24, the battery tube 16 is threadably removable from the sprayer 2.

In one embodiment, the disposable batteries 24 illustrated in FIGS. 1 and 2 are replaced with a rechargeable battery that is permanently installed in the battery tube 16. Once the energy is depleted from the rechargeable battery, the battery tube 16 is threadably removed from the sprayer 2 and inserted into a charger for recharging. In some embodiments, recharging may be accomplished inductively.

In one embodiment, where the sprayer 2 itself is meant to be disposable, the disposable batteries 24 illustrated in FIGS. 1 and 2 are replaced with a capacitor and coil system or a set of permanently installed non-rechargeable batteries. Thus, once the energy in the capacitor or non-rechargeable batteries is depleted, the entire sprayer 2 is thrown away. In some embodiments, the energy source may be located adjacent to the cap 14, as shown in phantom in FIG. 2, depicting a capacitor 24' near the cap 14.

Positioning the sprayer energy source (i.e., the batteries 24) within the reservoir 4 or adjacent to the cap 14 is advantageous for at least two reasons. First the sprayer 2 can have an energy source that is long lasting and powerful without resulting in an oversized and cumbersome housing 6. Second, positioning the batteries 24 within the reservoir lowers the sprayer's center of gravity. This makes a reservoir 4 equipped with the sprayer 2 less likely to tip over when set on a surface. Also, placing the weight of the batteries 24 below the gripping point of the sprayer 2 reduces the fatigue caused by using the sprayer 2, as compared to placing the weight of the batteries 24 above the gripping point (i.e., in the upper portions of the housing 6). Another advantage is that placing the batteries in a position in which the contents of the reservoir can contact them or their housing is that the contents help keep the batteries cool. Reduction of heat advantageously helps prolong battery life.

As shown in FIG. 1, the flexible intake tube 18 has a discharge end that is in fluid communication with the spraying mechanism contained in the housing 6 and an intake end that terminates within the weight 20 and is in fluid communication with the fluid 26 contained within the reservoir 4. The weight equipped flexible intake tube 18 is advantageous because it allows the sprayer 2 to operate regardless of the orientation of the sprayer 2 and its attached reservoir 4. For example, when the sprayer 2 is operated in an upright position as depicted in FIG. 1, the weight 20 causes the intake end of the flexible tube 18 to sink to the bottom of the fluid 26. Likewise, when the sprayer 2 is operated in an upside down position and the fluid 26 has accumulated near the neck 22 of the reservoir 4, the weight 20 causes the intake end of the flexible tube 18 to sink to the bottom of the fluid 26 (i.e., near the cap 14). Thus, regardless of the orientation of the reservoir 4, the weight 20 causes the intake end of the flexible tube 18 to be kept in fluid communication with the fluid 26 in the reservoir 4.

Figure 4:
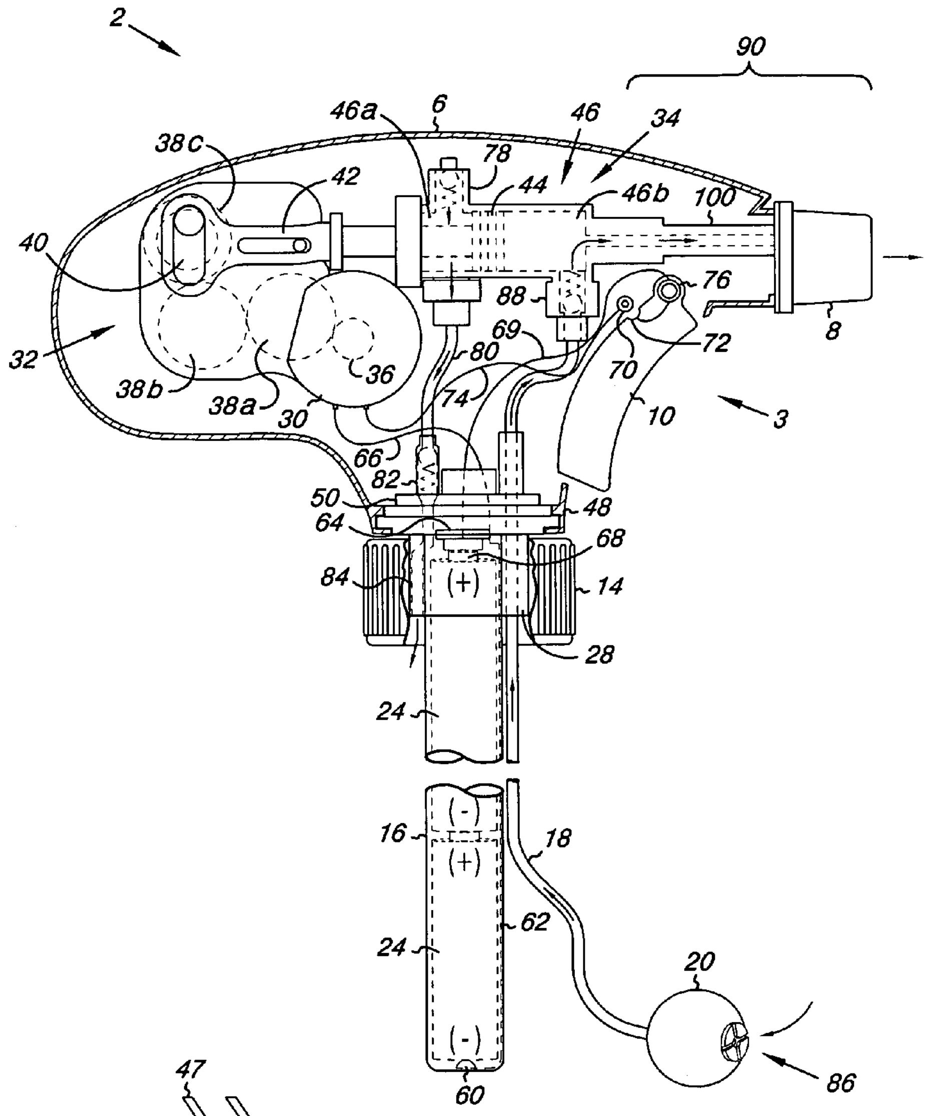
FIG. 4 is an elevation view of the safety lock side of the sprayer wherein the safety lock side of the housing is removed to reveal the pumping mechanism and the cap is partially cut away to reveal a coupling used to threadably attach the battery tube to the cap.
Figure 5:
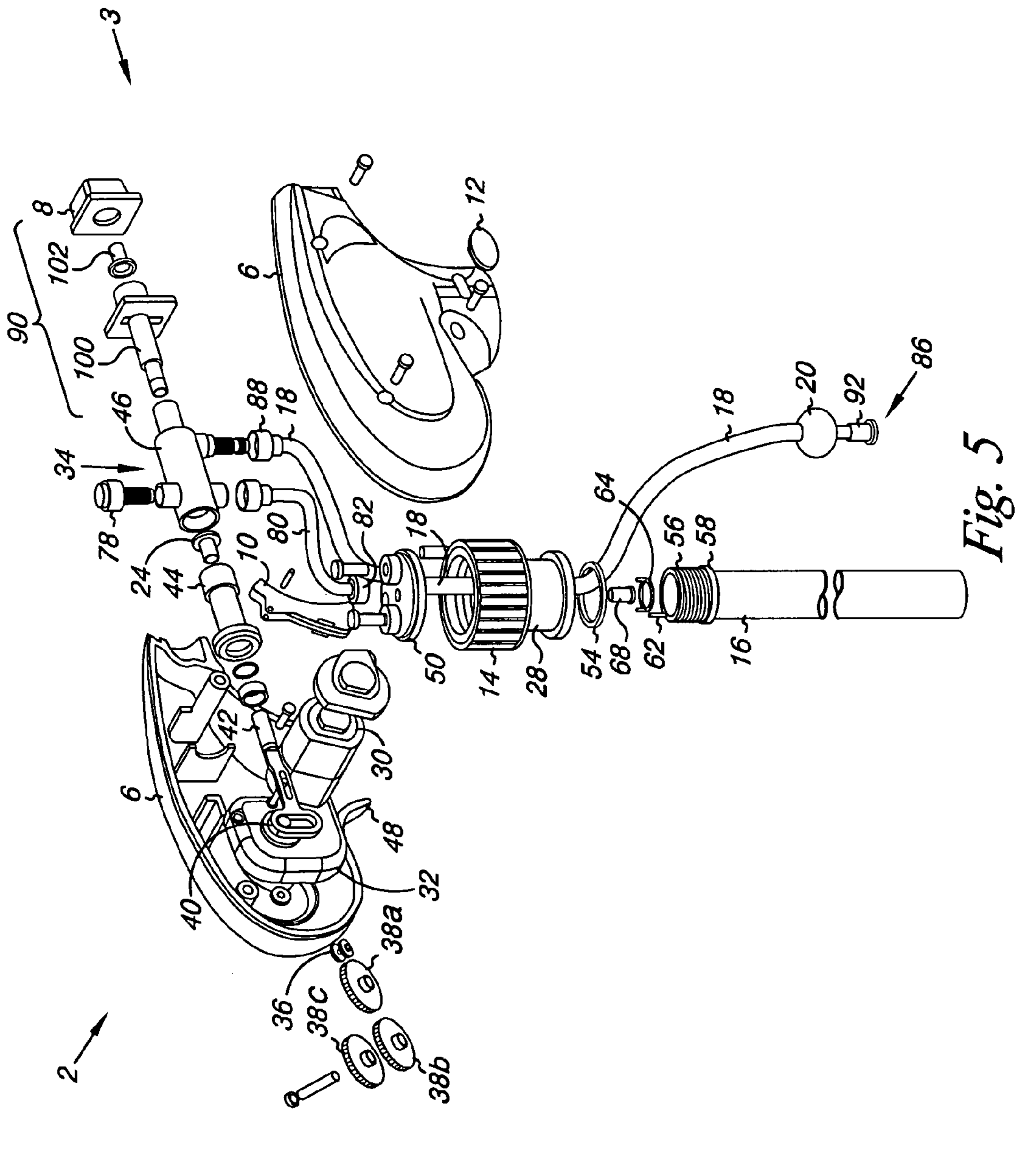
FIG. 5 is an exploded isometric view of the power sprayer.

For a detailed description of the pumping mechanism contained in the housing 6 and a description of the overall operation of the power sprayer 2, reference is now made to FIGS. 4 and 5. FIG. 4 is an elevation view of the safety lock side of the sprayer 2 wherein the safety lock side of the housing 6 is removed to reveal the pumping mechanism and the cap 14 is partially cut away to reveal a coupling 28 used to threadably attach the battery tube 16 to the cap 14. FIG. 5 is an exploded isometric view of the power sprayer 2.

Figure 4A:
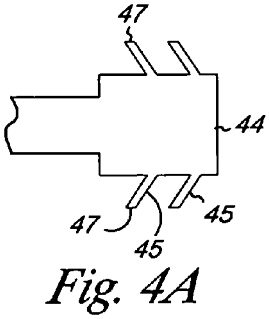
FIG. 4*a* depicts an embodiment of a piston of the pumping mechanism depicted in FIG. 4.

As indicated in FIGS. 4 and 5, the pumping mechanism is contained within the housing 6 and includes an electric motor 30, a transmission 32 and a pump 34. The motor 30 includes a drive gear 36, and the transmission 32 includes a series of three gears 38*a*, 38*b*, 38*c*, a cam 40, and a cam follower shaft 42. The pump 34 includes a piston 44 that is linearly displaceable within a cylinder 46 of the pump 34. FIG. 4*a* depicts in more detail that the piston has flanges 45, with tips 47, which help clear, purge or "sweep" the cylinder 46. The flanges facilitate the pumping of the contents, helping to seal the cylinder by acting as "O-rings," and maximizing the pump suction to draw in and push out the fluid or liquid being dispensed. The flanges also assist in the replacement of air pressure in and return of excess liquid or fluid to the container, thereby helping to prevent both leaking and a vacuum in the reservoir. Although two generally annular, circumferential flanges are depicted, it should understood that other embodiments, for example, using a different number of flanges or flanges of a different shape, may be used. Also, the flanges may be generally flexible, particularly the tips, and/or integrally formed with the piston, or they may be separate structures, e.g., rings, that are operably coupled to or carried by the piston. While FIGS. 4, 4*a* and 5 illustrate the employment of a piston-type pump 34, those skilled in the art will readily understand that a gear pump or other suitable pumping mechanism may be substituted for the piston pump 34 without departing from the spirit of the invention.

Figure 14:
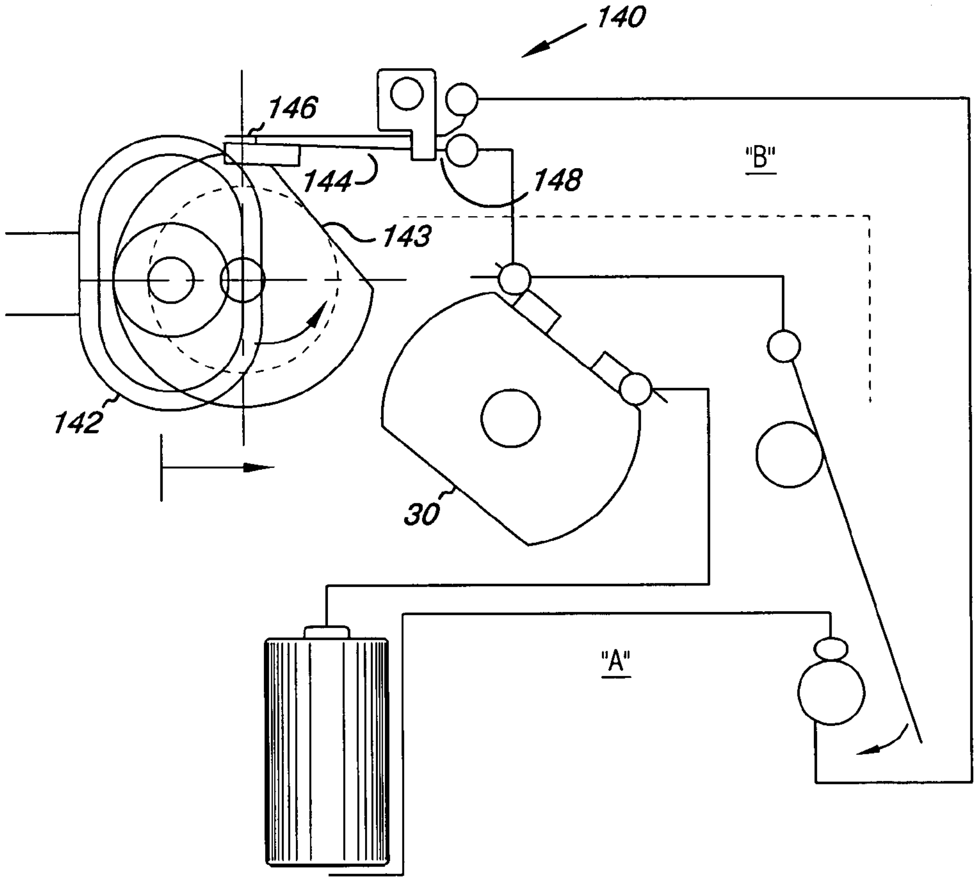
FIG. 14 is a schematic of one embodiment of an anti-dribble switch for use with the sprayer of the present invention.
Figure 15A:
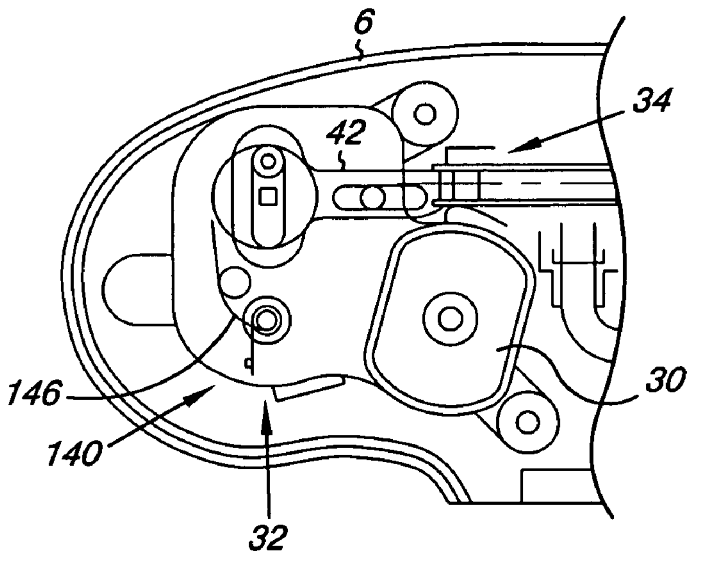
FIGS. 15*a* and 15*b*, is a schematic depicting two operational positions of the switch of FIG. 14.
Figure 15B:
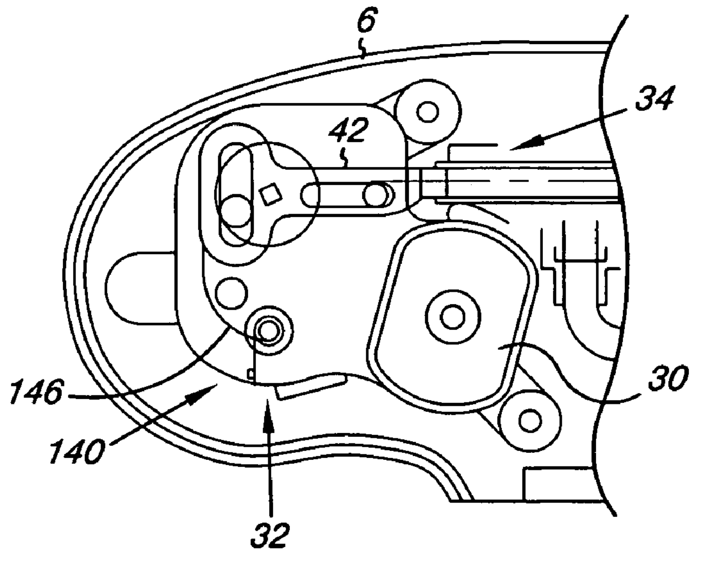
Figure 16:
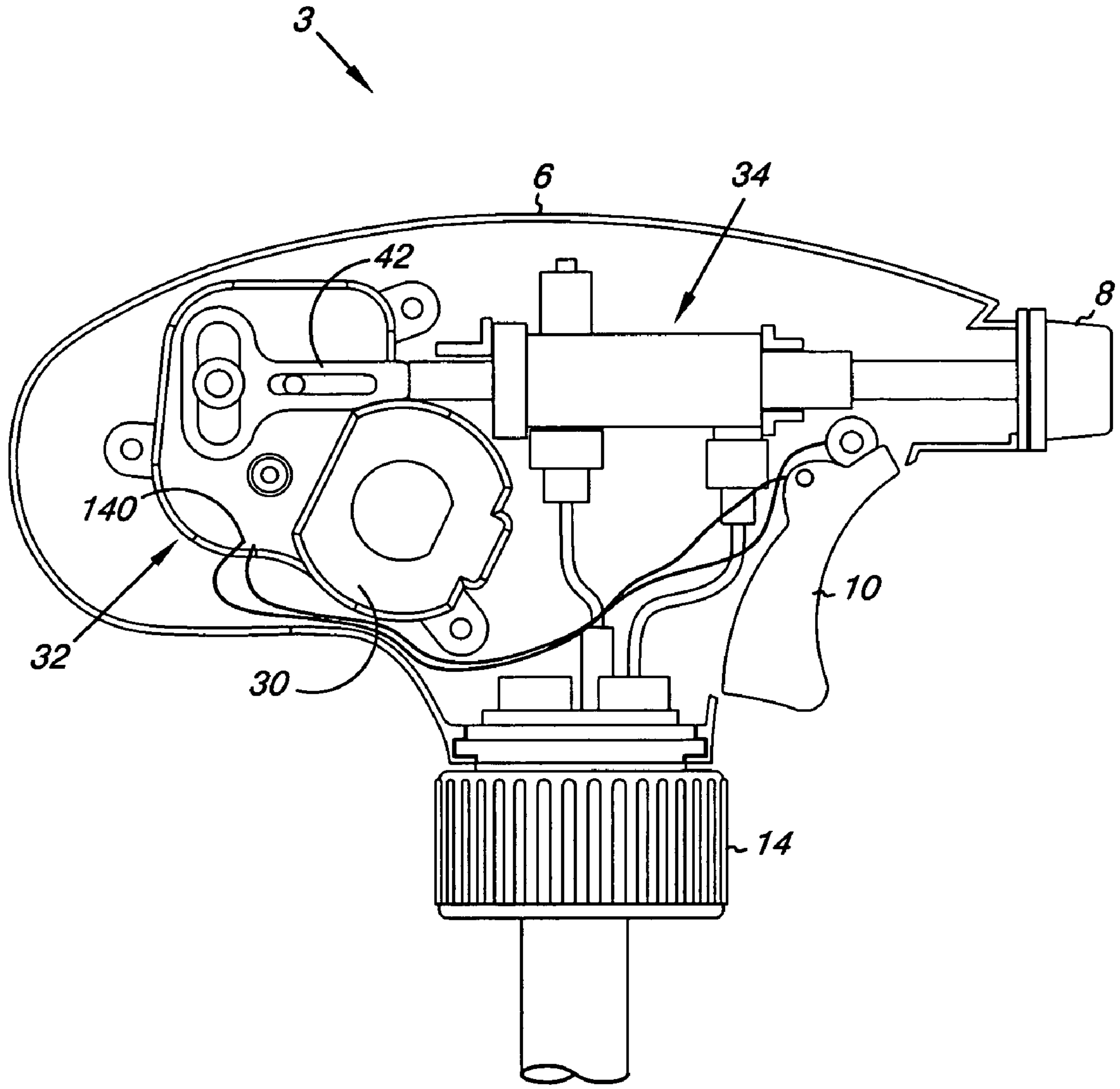
FIG. 16 depicts one embodiment of the present invention, wherein a switching arrangement of the type shown in FIG. 14 is incorporated.

With reference to FIGS. 14-16, some embodiments of the present invention can include a switch mechanism 140. This switch mechanism 140 may be thought of as a timing, positioning or delay circuit. It provides for and/or enhances the clearing, purging or sweeping of the cylinder 46, and/or helps to prevent the fluid to be dispensed from continuing to flow, drip or leak from the nozzle of the sprayer after a user has released the trigger. Thus, the switch mechanism 140 provides an "anti-dribble" feature for embodiments of motorized pump sprayers. With reference to FIGS. 14 and 15, in one embodiment the switch mechanism 140 comprises a cam 142, a spring 144, an electrical contact 146 and suitable wires 148. Two wires 148 are shown but as many as necessary may be used. In some embodiments, the switch 140 may be what is commonly known as a leaf-type switch, but any suitable arrangement of similar or other suitable components for providing similar functions may be used.

The above-identified switch components are arranged to control the position of the piston 44 in the cylinder 46. In effect, the switch mechanism 140 creates a secondary operating circuit (indicated generally at "B" in FIG. 14) to keep an electrical supply on to the motor (even though the trigger is released and the primary or trigger circuit, indicated generally at "A" is broken) until the piston 44 is in a desired position. In one embodiment, the cam 142 is coupled to or into the gear assembly (although it could be located in a separate housing, on the piston actuating arm or in another suitable location). The cam 142 is shaped and positioned adjacent to the switch mechanism 140 is such a way that when the operator lets go of the trigger, the secondary circuit provided by the switching mechanism 140 is kept closed until the piston 44 begins its return stroke. At that time, the cam 142 is turned to present its flattened area 143 to the switch, allowing the switch to open via the urging of the spring 144, which stops all power to the motor. Thus, any residual inertia and/or gradual slow down of the piston 44 occurs on its return stroke, thereby eliminating or substantially reducing further filling of the cylinder.

FIG. 15 depicts two states of one embodiment of the switch mechanism 140, namely with the switch mechanism on (FIG. 15*a*) and with the switch mechanism off (FIG. 15*b*). FIG. 16 depicts one arrangement of the switch mechanism 140 as it might be used in a sprayer such as the sprayer of the present invention.

Figure 17:
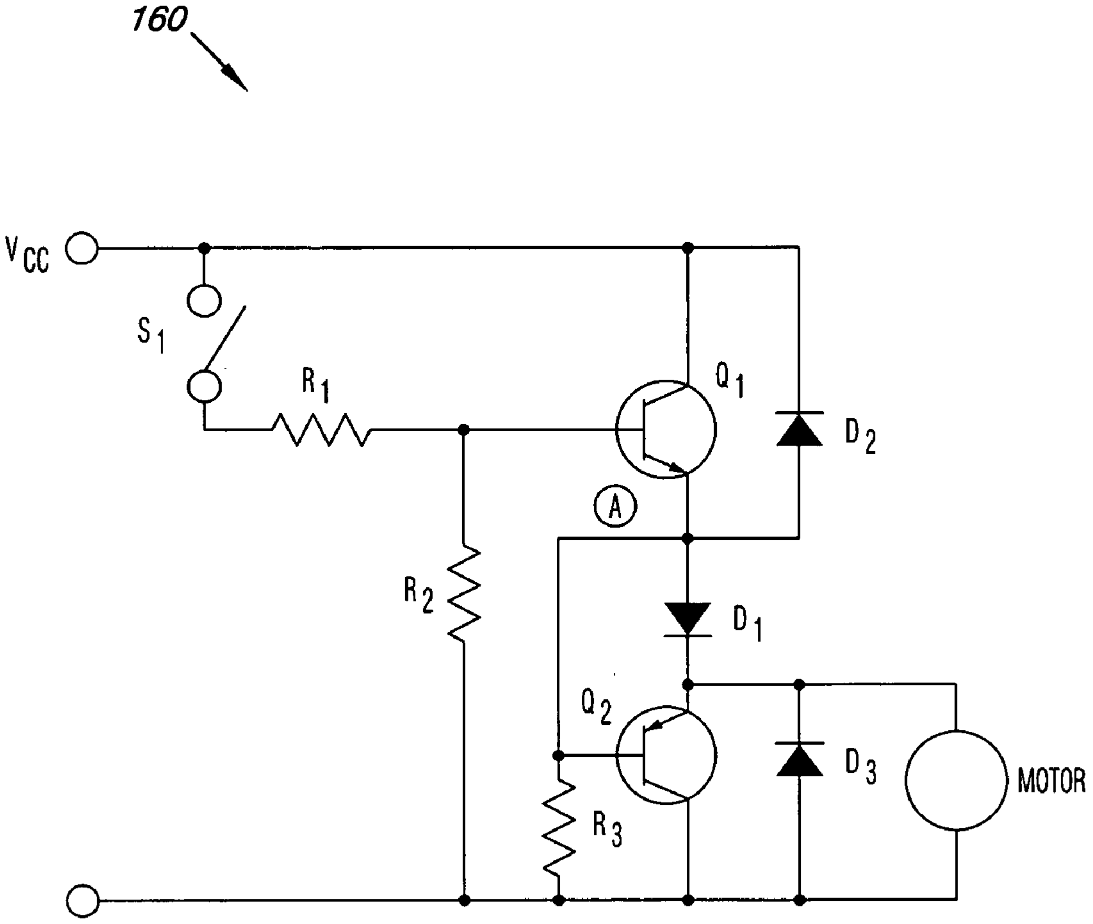
FIG. 17 is a schematic of a braking circuit which may be incorporated in some embodiments of a sprayer in accordance with the present invention.

FIG. 17 depicts a circuit 160 of the type which may be used to provide electrical motor braking, particularly as to small DC motors. It is described by Reed Electronics. In the present invention, as shown at 160 in FIG. 18, such a circuit 160 may be used to enhance the anti-dribble, clear, purge, or sweep features. As set forth above, one possible difficulty with motorized sprayers is that the piston may travel after the actuator is released. Further, the motor as well may tend to move after the trigger is released depending on its initial speed and inertia. The circuit depicted in FIG. 17 can be useful for applications and systems that may not need absolutely precise speed of control and stopping positions, but which can benefit from enhanced deceleration.

Generally, the circuit depicted in FIG. 17 comprises two portions. $Q_1$ plays the role of the switch. $D_2$ protects $Q_2$ against inductive surges. Resistor $R_2$ keeps $Q_1$ off as long as Switch $S_1$ is open. $R_1$ limits the base current of $Q_1$ when $S_1$ is closed. $S_1$ can be a manual switch, a relay contact, an opto-coupler, or a transistor. If $S_1$ is closed, $Q_1$ turns on, and the motor runs. $Q_2$, $D_1$ and $R_3$ comprise the braking circuit. This circuit is similar to the output circuit of TTL gates. $D_3$ protects $Q_2$ from inductive surges. When $S_1$ closes, $Q_1$ turns on, and the voltage at Point A goes high (near $V_{cc}$). The voltage at the base of $Q_2$ is higher than the voltage at the emitter, because of the voltage drop is $D_1$. If you open $S_1$ while the motor is running, $Q_1$ turns off. The voltage at Point A is near zero. The self-induced, back-EMF voltage from the motor sees a short circuit in $Q_2$, whose emitter is more positive than its base and thus conducts. Short-circuiting the motor results in braking it the higher the speed or the motor, the stronger the braking effect.

A braking circuit or function such as that depicted in FIG. 17 can be used in conjunction with the anti-dribble switch mechanism 140 as described with reference to FIGS. 14-16. Further, it may be used in any embodiment of a power sprayer in accordance with the present invention, with or without an anti-dribble switch mechanism and/or with or without features for helping to clear, purge or sweep, to help prevent accidental dripping or discharge of the fluid to be dispensed after the actuator or trigger is released to stop spraying.

As indicated in FIGS. 4 and 5, the drive gear 36 powers gear 38*a*, which in turn powers gear 38*b*, which in turn powers gear 38*c*. Gear 38*c* causes the cam 40 to rotate, which causes the cam follower shaft 42 to reciprocally, linearly displace. The linear displacement of the cam follower shaft 42 causes the piston 44 to reciprocally, linearly displace within the cylinder 46 of the pump 34.

As shown in FIGS. 4 and 5, the base of the housing 6 has a grooved neck 48 that receives a disc 50 therein. The disc 50 is secured to the top of coupling 28, which is pivotally mounted within the cap 14. As shown in FIG. 5, the cap 14 has a waterproof ring 54 for sealing the opening in the neck 22 of reservoir 4 when the cap 14 is threaded on tight.

As illustrated in FIG. 5, the top of the battery tube 16 has a plurality of male threads 56 for threadably engaging the female threads within the coupling 28. When battery tube 16 is threaded tightly into the coupling 28, a sealing ring 58 prevents any fluid 26 from entering the battery tube 16 from the reservoir 4.

As shown in FIG. 4, a negative conductor 60 makes electrical contact with the negative pole of the bottom battery 24. The negative conductor 60 is electrically connected to a first negative conductive pathway 62 that runs the length of the battery tube 16 to make electrical contact with a negative conductor ring 64 mounted in the bottom inside surface of the coupling 28. The negative conductor ring 64 makes electrical contact with a second negative conductive pathway 66 that runs to a first electrical lead on the motor 30.

As shown in FIG. 4, the coupling 28 has a positive conductor 68 for making electrical contact with the positive pole of the top battery 24 in the battery tube 16. The positive conductor 68 is electrically connected to a first positive conductive pathway 69 that is electrically connected to a conductive sleeve 70 near the trigger 10. A conductive saddle 72 is mounted on the trigger 10 and oriented and configured to mate with the conductive sleeve 70 when the trigger 10 is depressed by the user.

As indicated in FIG. 4, a second positive conductive pathway 74 is electrically connected to the conductive saddle 72 and runs to a second electrical lead on the motor 30. When the trigger 10 is depressed, the conductive saddle 72 and the conductive sleeve 70 are placed in electrical contact. This completes the electrical circuit between the energy supply (i.e., the batteries 24) and the motor 30 and causes the sprayer 2 to function. In one embodiment, a portion of the second positive conductive pathway 74 is formed around the pivot point 76 of the trigger 10 to serve as a spring to forwardly bias the trigger 10.

As shown in FIG. 4, when the piston 44 is displaced towards the nozzle cap 8, air is drawn in through a first air check valve 78 (which in one embodiment is a spring loaded ball type check valve) into the rearward section 46*a* of the cylinder 46. In one embodiment, the first air check valve 78 is located near the top of the cylinder 46. On its backstroke, as the piston 44 displaces away from the nozzle cap 8, the air is forced out of the rearward section 46*a* of the cylinder 46, into an air tube 80, through a second air check valve 82 (which in one embodiment is a spring loaded ball type check valve), through an air channel 84 running through the coupling 28, and into the reservoir 4 to prevent vacuum lock when the sprayer 2 is operating. In one embodiment, the second air check valve 82 is located near the bottom of the cylinder 46 approximately opposite the first air check valve 78. This linear or in-line arrangement allows any moisture accumulating in the rearward section 46*a* of the cylinder 46 to be purged, flushed, swept from and/or drained from the rearward section 46*a* into the reservoir 4. This purging is enhanced by the flanges 45.

As indicated in FIG. 4, when the piston 44 is displaced away from the nozzle cap 8, the fluid 26 is drawn in into the intake opening 86 of the flexible intake tube 18, through the flexible intake tube 18 (which passes through the coupling 28), through a fluid check valve 88 (which in one embodiment is a spring loaded ball type check valve), and into the front section 46*b* of the cylinder 46. In one embodiment, the fluid check valve 88 is located near the bottom of the cylinder 46. As the piston 44 displaces towards the nozzle cap 8, the fluid 26 is forced out of the front section 46*b* of the cylinder 46 and through the nozzle assembly 90 to the atmosphere.

Figure 6:
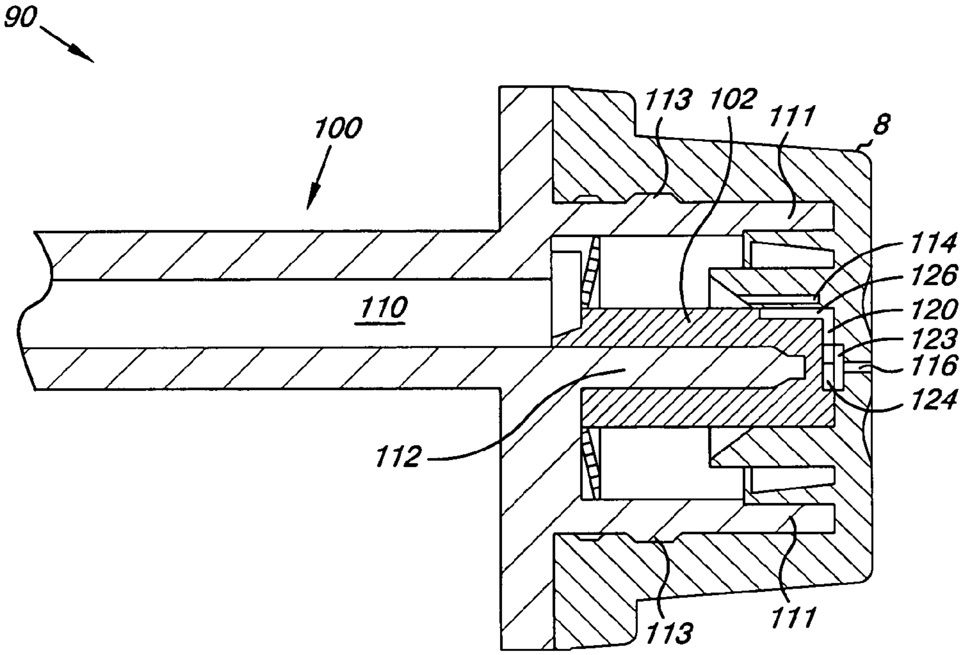
FIG. 6 is a vertical section taken through the nozzle assembly.

As shown in FIG. 5, the nozzle assembly 90 includes a nozzle tube 100, a nozzle valve 102 and the nozzle cap 8. As illustrated in FIG. 6, which is a vertical section taken through the nozzle assembly 90, the nozzle tube 100 has a nozzle channel 110, a pivot surface wall 111, and a pin 112 on which the nozzle valve 102 is mounted. The nozzle cap 8 is pivotally mounted about the pivot surface wall 111, and the pivot surface wall 111 has at least one retaining ridge 113 that mates with a corresponding groove in the nozzle cap 8 to retain the nozzle cap 8 in place.

Figure 7:
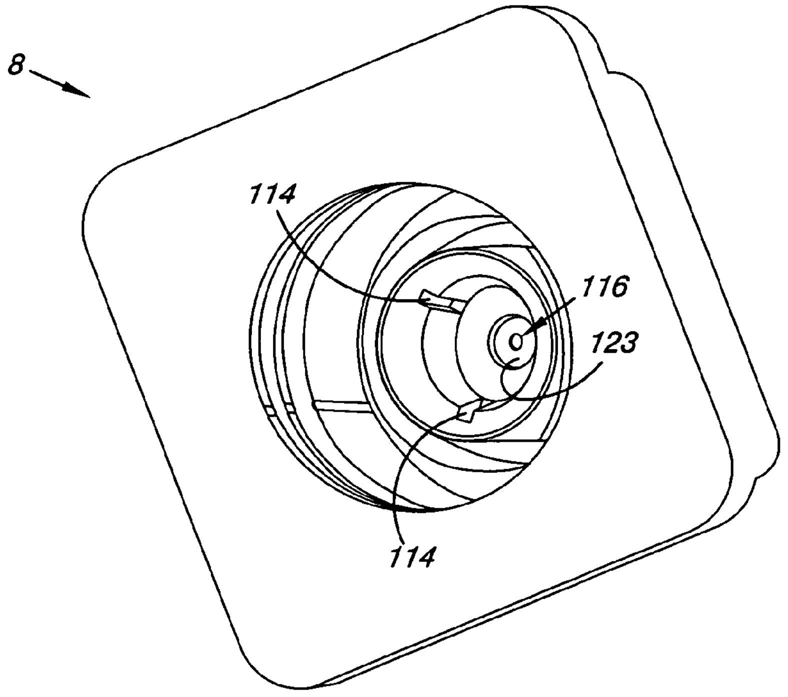
FIG. 7 is an isometric view of the interior of the nozzle cap.

As indicated in FIG. 6 and more clearly depicted in FIG. 7, which is an isometric view of the interior of the nozzle cap 8, the nozzle cap 8 has at least one cap channel 114 that is in fluid communication with the nozzle channel 110. The nozzle cap 8 also has a recessed area 115 surrounding a discharge orifice 116.

Figure 8:
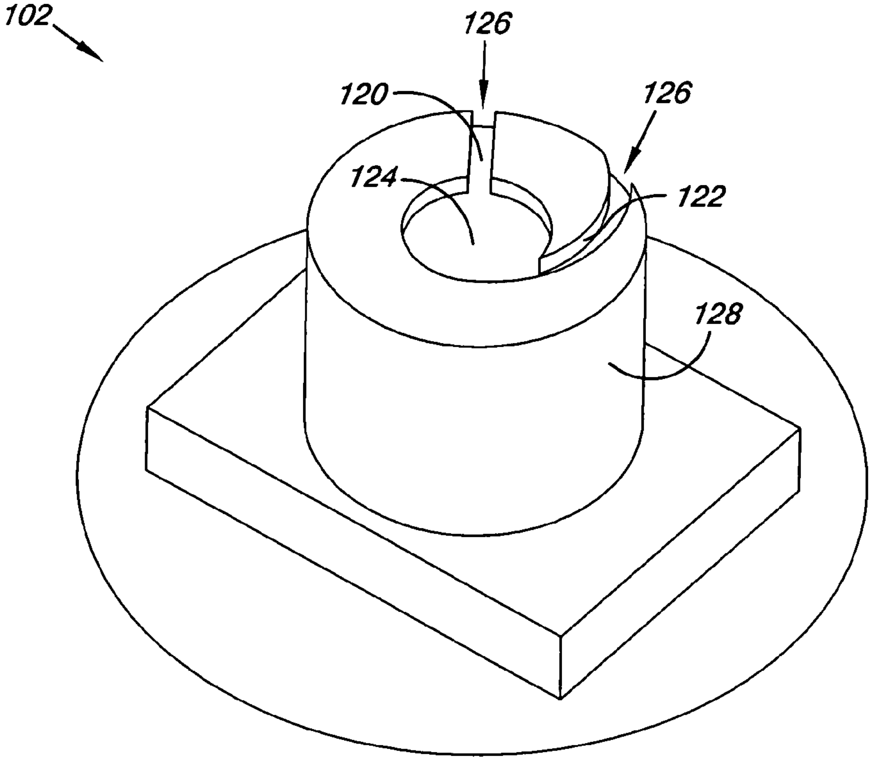
FIG. 8 is an isometric view of the discharge end of the nozzle valve.

As illustrated in FIG. 6 and more clearly depicted in FIG. 8, which is an isometric view of the discharge end of the nozzle valve 102, the nozzle valve 102 has a radial channel 120 and a tangential channel 122 that lead to a circular recessed center 124 at the center of the nozzle's end. The circular recessed center 124 and the recessed area 115 in the nozzle cap 8 combine to form a swirl chamber. The tangential channel 122 and the radial channel 120 each have a leader channel 126 that is recessed into the cylindrical side 128 of the nozzle valve 102.

As shown in FIG. 6, when the nozzle cap 8 is pivoted about the pivot surface wall 111 such that the word "STREAM" on the nozzle cap 8 is oriented upwards, the cap channel 114 is placed in fluid communication with the leader channel 126 that is associated with the radial channel 120. Thus, when the sprayer 2 is actuated, liquid travels through the nozzle channel 110, the cap channel 114, the leader channel 126, the radial channel 120, the swirl chamber 115, 124, and out the orifice 116 as a stream-type flow.

Similarly, when the nozzle cap 8 is pivoted about the pivot surface wall 111 such that the word "SPRAY" on the nozzle cap 8 is oriented upwards, the cap channel 114 is placed in fluid communication with the leader channel 126 that is associated with the tangential channel 122. Thus, when the sprayer 2 is actuated, liquid travels through the nozzle channel 110, the cap channel 114, the leader channel 126, the tangential channel 122, the swirl chamber 115, 124, and out the orifice 116 as a spray-type flow.

In some embodiments, when the nozzle cap 8 is pivoted about the pivot surface wall 111 to a selected position, the leader channels 126 are not placed in fluid communication with the cap channel 114. Consequently, liquid cannot flow through the nozzle assembly 90.

Figure 9:
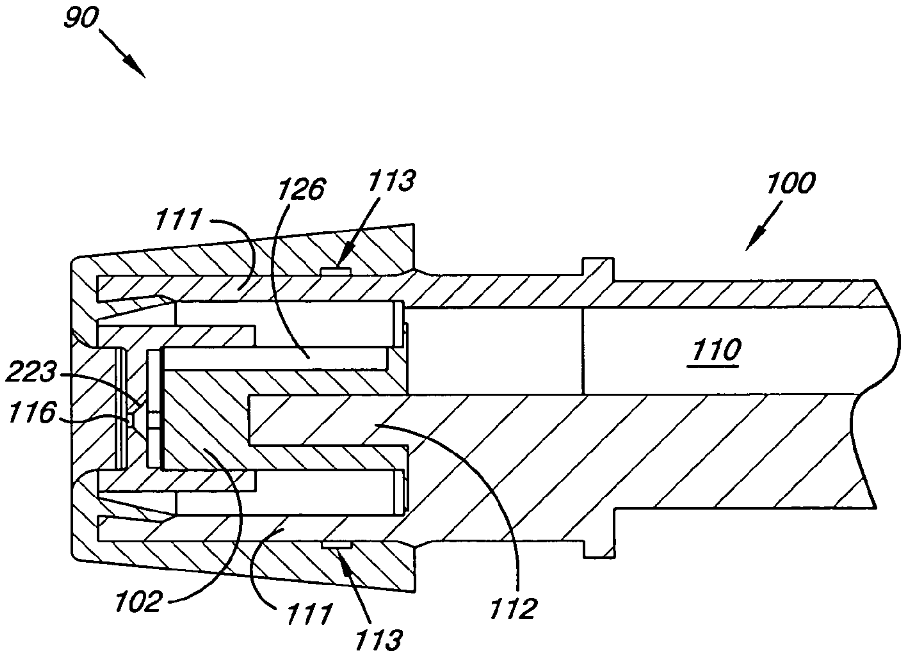
FIG. 9 is a vertical section taken through the nozzle assembly.
Figure 10:
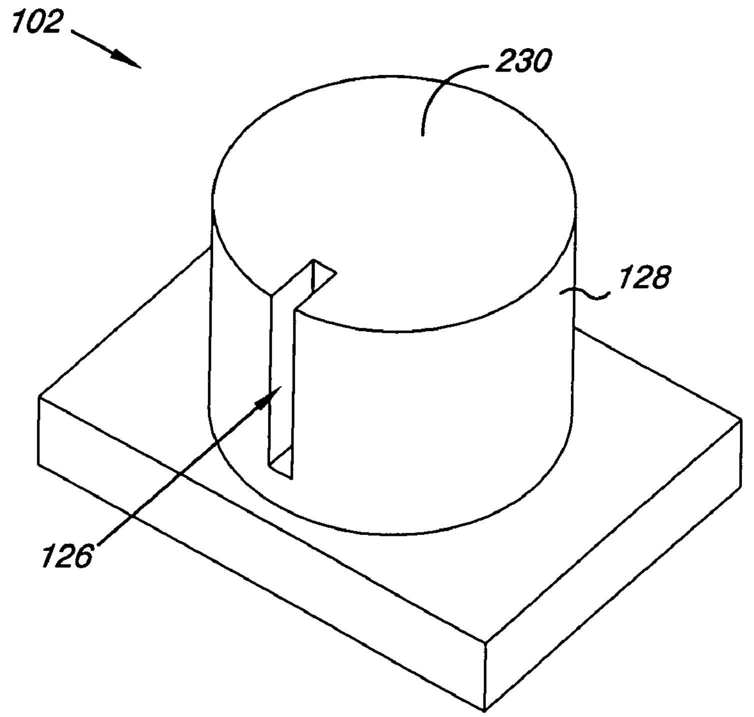
FIG. 10 is an isometric view of the discharge end of the nozzle valve.

An alternative configuration for the nozzle assembly 90 is shown in FIG. 9, which is a vertical section taken through the nozzle assembly 90. As indicated in FIG. 9 and more clearly depicted in FIG. 10, which is an isometric view of the discharge end of the nozzle valve 102, the nozzle valve 102 has a leader channel 126 that is recessed into the cylindrical side 128 of the nozzle valve 102. The leader channel 126 runs from near the base of the nozzle valve 126 to the end 150 of the nozzle valve 102, which is generally uniformly planar.

Figure 11:
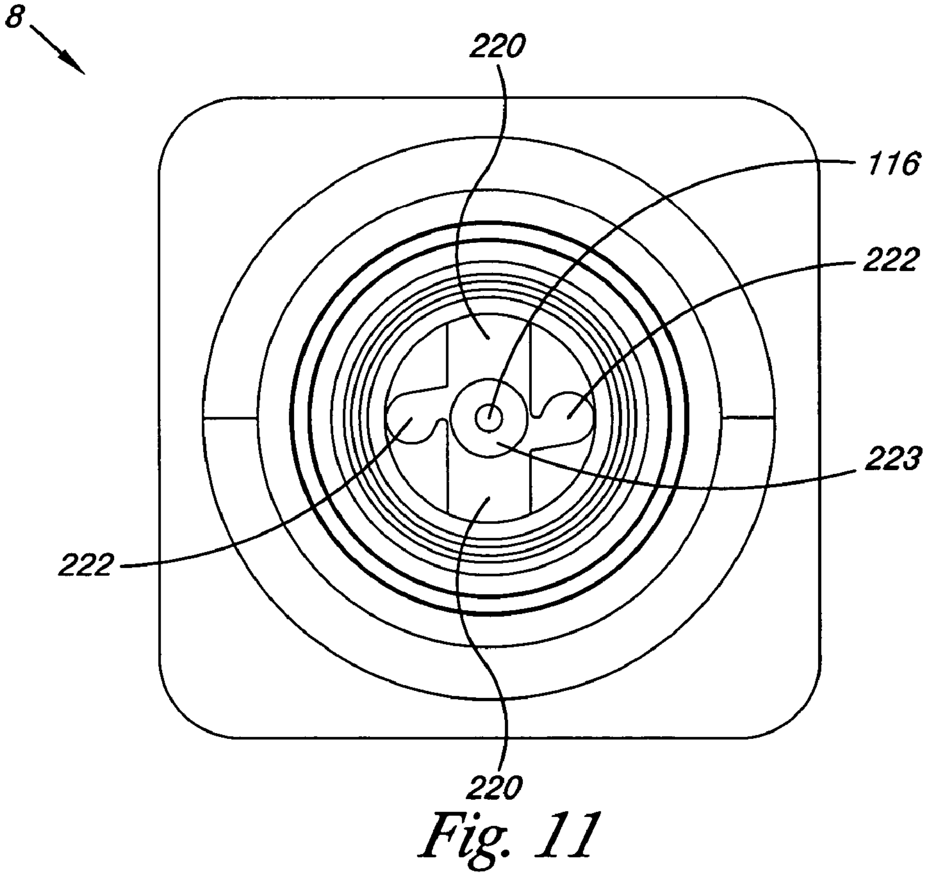
FIG. 11 is an elevation view of the interior of the nozzle cap.

As indicated in FIG. 9 and more clearly depicted in FIG. 11, which is an elevation view of the interior of the nozzle cap 8, the nozzle cap 8 has at least one radial channel 220 recessed into the interior surface of the nozzle cap 8. The nozzle cap 8 also has at least one tangential channel 222 recessed into the interior surface of the nozzle cap 8. Each radial and tangential channel 220, 222 extends to a central circular recessed area 215 in the interior surface of the nozzle cap 8. The circular recessed area 215 surrounds the discharge orifice 116. The circular recessed area 215 serves as a swirl chamber.

In one embodiment, as illustrated in FIG. 9, the circular recessed area 215 tapers towards the discharge orifice 116 and, as a result, has a Y-shaped cross-section. In another embodiment, the circular recessed area 215 does not taper towards the discharge orifice 116, but has a surface that is generally perpendicular to the axis of the discharge orifice 116. In other words, the circular recessed area 215 has a T-shaped cross-section as depicted in FIG. 6.

As shown in FIG. 9, when the nozzle cap 8 is pivoted about the pivot surface wall 111 such that the word "STREAM" on the nozzle cap 8 is oriented upwards, the radial channel 220 is placed in fluid communication with the leader channel 126. Thus, when the sprayer 2 is actuated, liquid travels through the nozzle channel 110, the leader channel 126, the radial channel 220, the swirl chamber 215, and out the orifice 116 as a stream-type flow.

Similarly, when the nozzle cap 8 is pivoted about the pivot surface wall 111 such that the word "SPRAY" on the nozzle cap 8 is oriented upwards, the tangential channel 222 is placed in fluid communication with the leader channel 126. Thus, when the sprayer 2 is actuated, liquid travels through the nozzle channel 110, the leader channel 126, the tangential channel 222, the swirl chamber 215, and out the orifice 116 as a spray-type flow.

Figure 12:
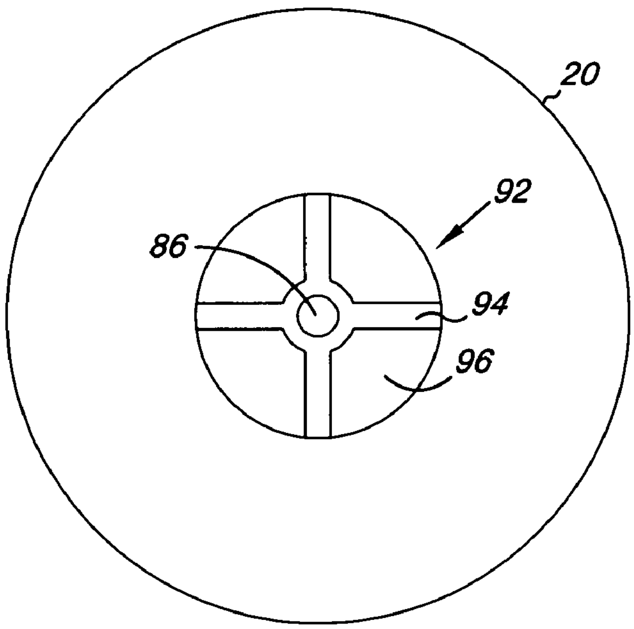
FIG. 12 is a front elevation view of the spherical weight that is mounted on the end of the flexible intake tube.
Figure 13:
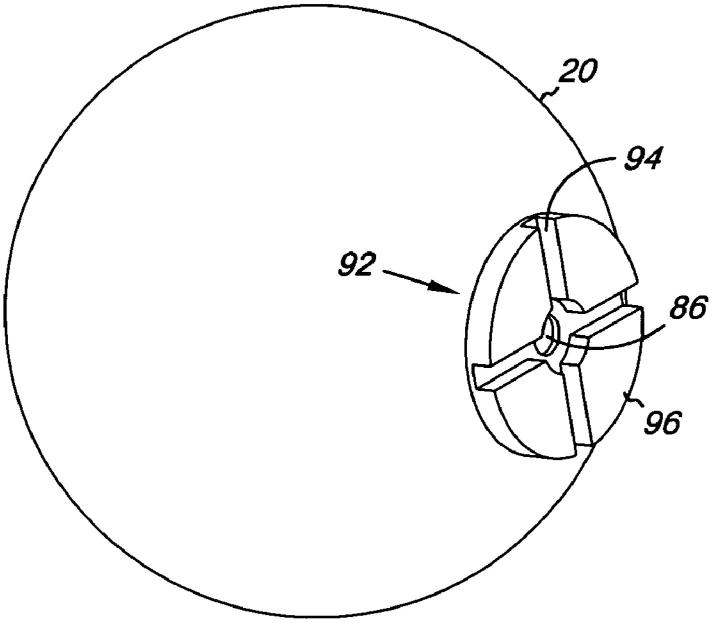
FIG. 13 is an isometric view of the spherical weight that is mounted on the end of the flexible intake tube.

As indicated in FIGS. 12 and 13, which are front elevation and isometric views, respectively, of the spherical weight 20 that is mounted on the end of the flexible intake tube 18, the intake opening 86 is recessed in the center of a disc 92 mounted on the spherical weight 20. The disc 92 has channels 94 that run from the outer circumference of the disc 92 to the intake opening 86, thereby forming protrusions 96 that extend beyond the intake opening 86. The protrusions 96 and channels 94 combine to prevent the intake opening 86 from being blocked by a surface of the reservoir 4 or the cap 14.

In one embodiment, the weight 20 is a very dense polymer sphere. In other embodiments, the weight 20 may be ceramic, glass, rubber, die cast metal, brass, etc. Regardless of the material selected, the material should be resistant to the corrosive effects of the liquid contained in the reservoir 4 and dense enough to sink in the liquid. The weight 20 is sized to be sufficiently heavy to draw the intake opening 86 of the flexible tube 18 to the bottom most portion of the fluid 26 contained in the reservoir 4, regardless of whether the reservoir 4 is oriented upright, sideways, upside down, etc.

In one embodiment, the flexible intake tube 18 is a very flexible silicone rubber. In other embodiments, the flexible intake tube 18 is another very flexible polymer. The length of the flexible intake tube 18 is sufficient to reach the bottom of the container, but not so excessive that it tangles with itself.

Figure 18:
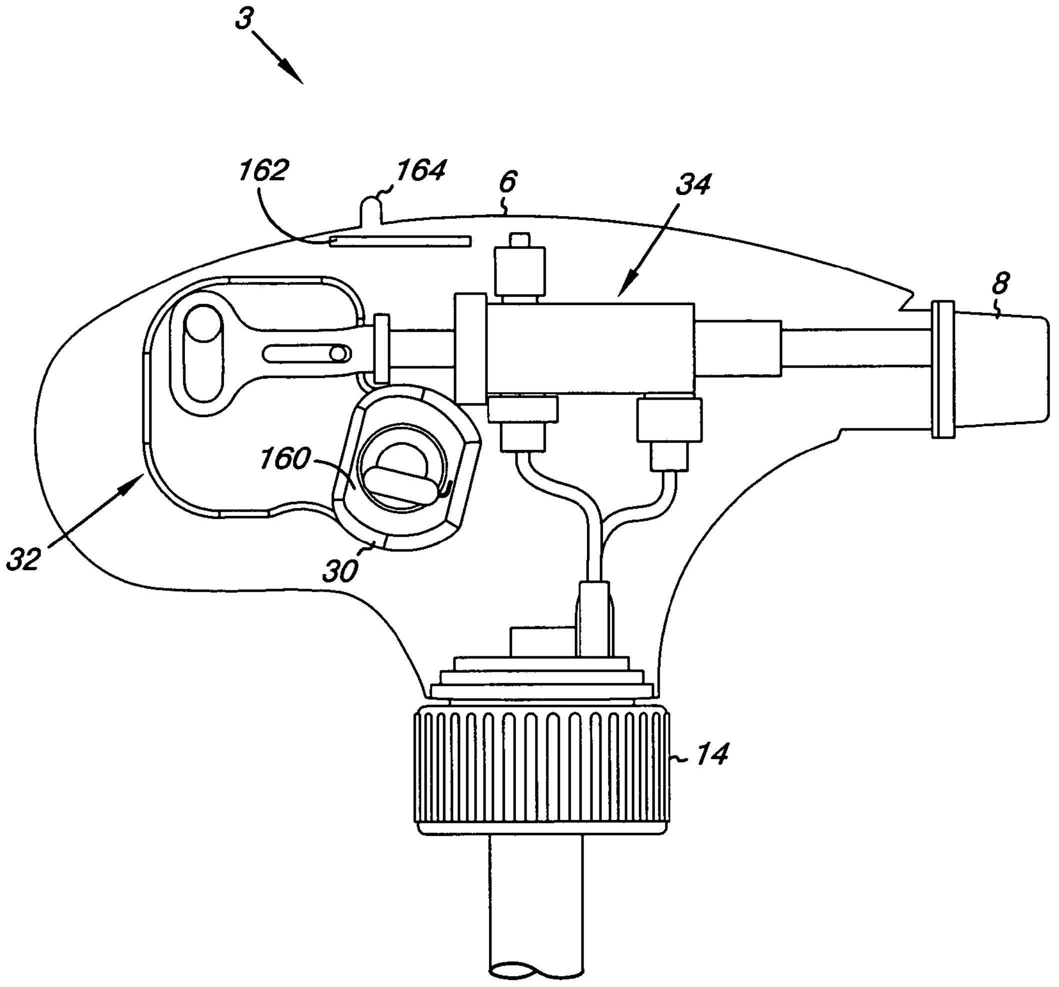
FIG. 18 is a elevational view representing of one embodiment of the sprayer of the present invention, and depicting an incorporated motor brake, control chip and indicator.

FIG. 18 is a elevational view representing of one embodiment of the sprayer of the present invention, and depicting an incorporated motor brake 160 of the type depicted in FIG. 17. FIG. 18 further depicts the incorporation of a suitable microprocessor control chip or PCB board 162. Such a controller 162 may be programmed and/or used to sense, remember, control and regulate functions and operations of a sprayer in accordance with the present invention. FIG. 18 further depicts the incorporation of an indicator or display feature 164. This indication or display feature 164 may be visual, in the form of a suitable LED (as shown), bulb, LCD, etc., or it may be audible or tactile. Such an indicator 164 may be used to, for example, indicate low battery power or as an in-store attraction device. It can be operably coupled to the controller 162 if such a controller is used. It may have its own power source, e.g., a button battery, or it may share the sprayer power source. It could be operated independently of the trigger or it could be activated by depressing the trigger.

Figure 19:
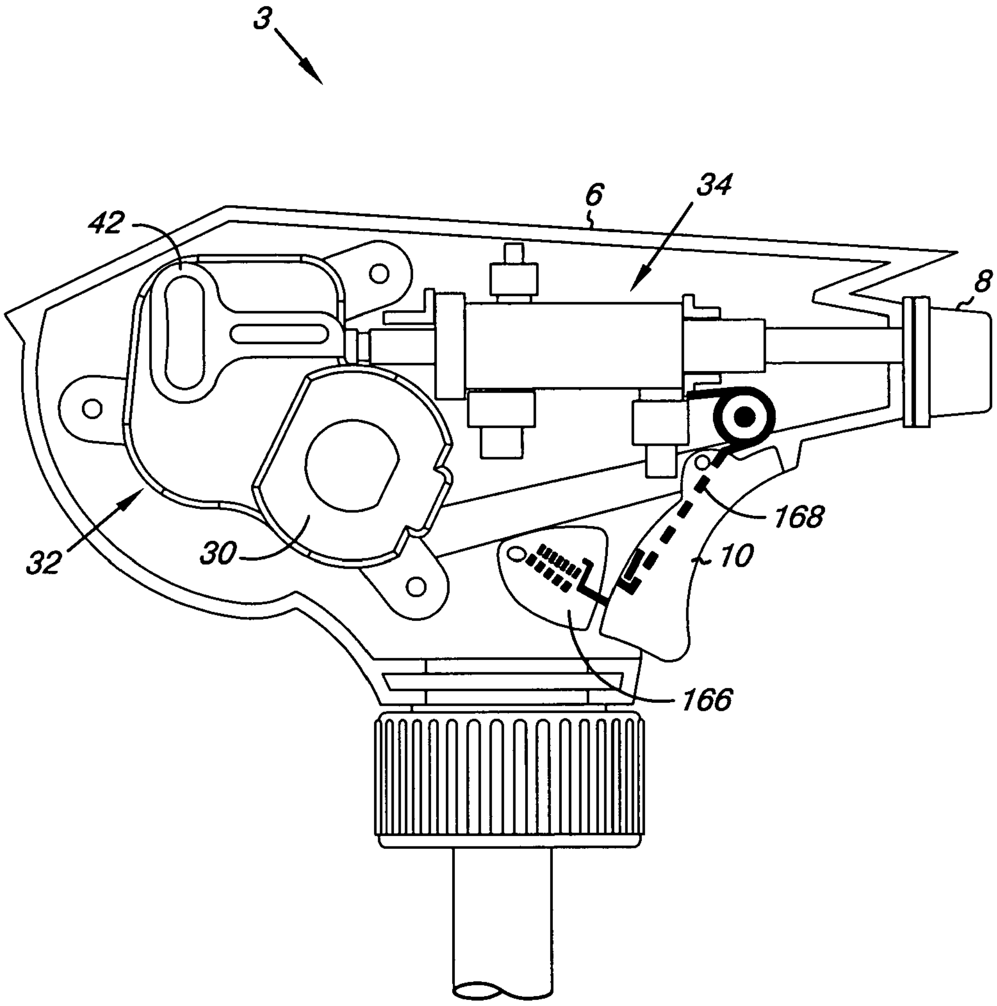
FIG. 19 is a elevational view representing of one embodiment of the sprayer of the present invention, and depicting an incorporated rheostatic actuating mechanism or trigger.

FIG. 19 is a elevational view representing of one embodiment of the sprayer of the present invention, and depicting a rheostat or rheostatic switch 166 operably coupled to the actuating mechanism or trigger 10. Rheostatic arrangements, switches or circuits are well-known, and any suitable rheostatic arrangement, switch or circuit can be used in a sprayer in accordance with the present invention to, for example, control or regulate the speed of the motor at the actuating mechanism or trigger, thereby controls the speed that the pump cycles and the amount of fluid discharged. Note that, in a sprayer in accordance with the present invention, the trigger may be urged to its off position by a suitable spring 168 or other biasing or tensioning device.

Figure 20:
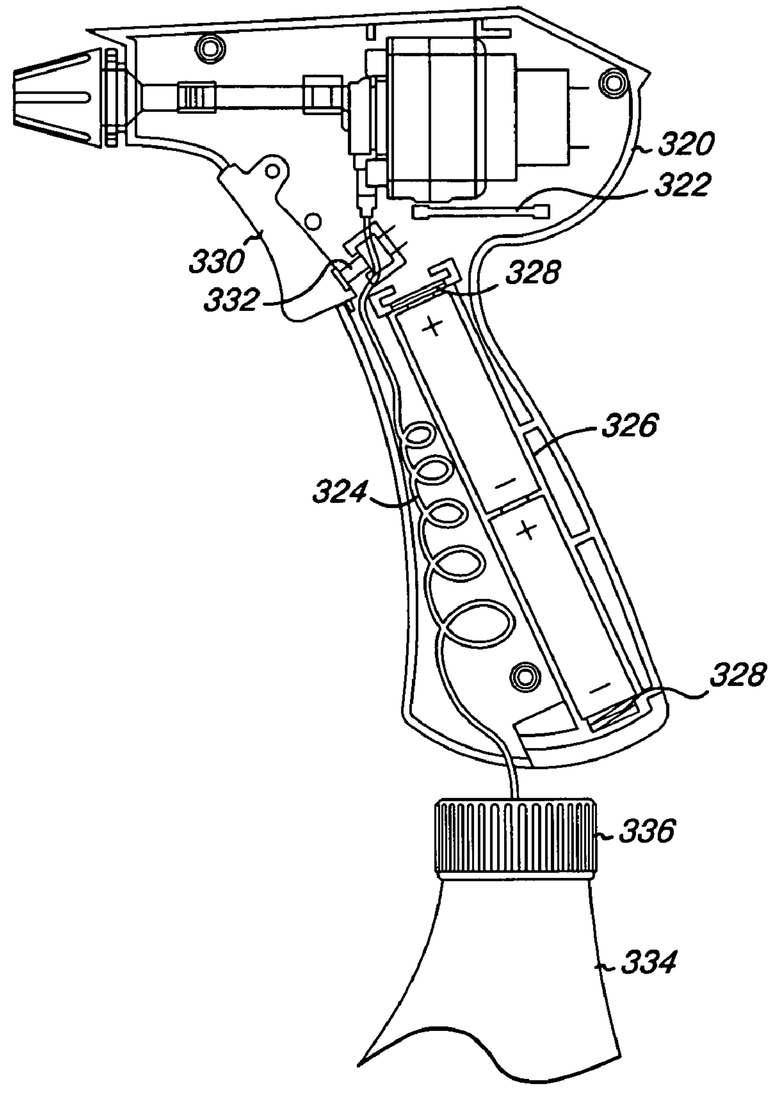
FIG. 20 depicts another embodiment of the present invention.
Figure 21:
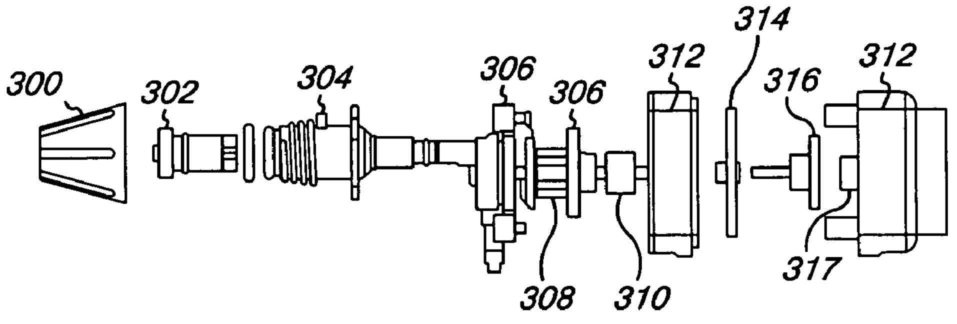
FIG. 21 depicts detailed of the embodiment depicted in FIG. 20.
Figure 22:
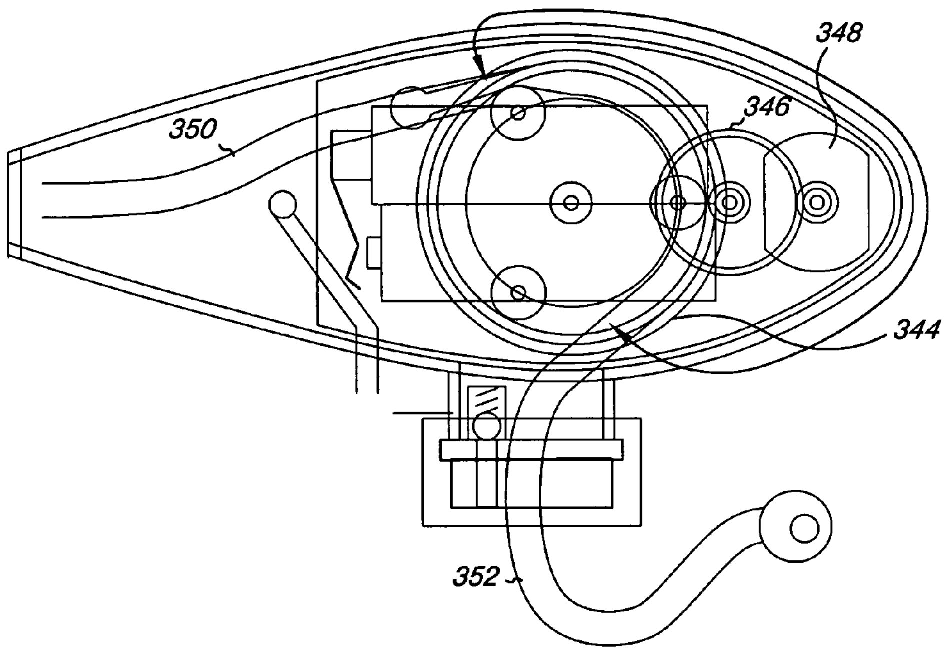
FIG. 22 is a plan view depicting, in representation, another embodiment of the present invention.
Figure 23:
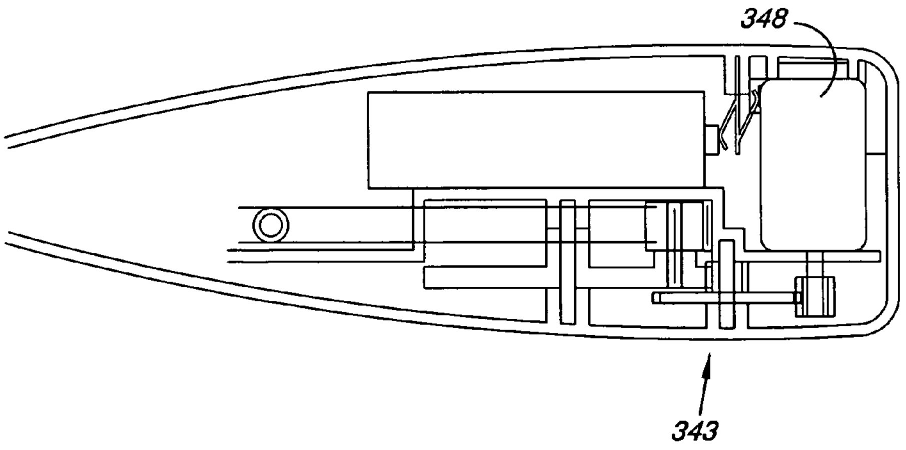
FIG. 23 is a side view of the embodiment of FIG. 22.
Figure 24:
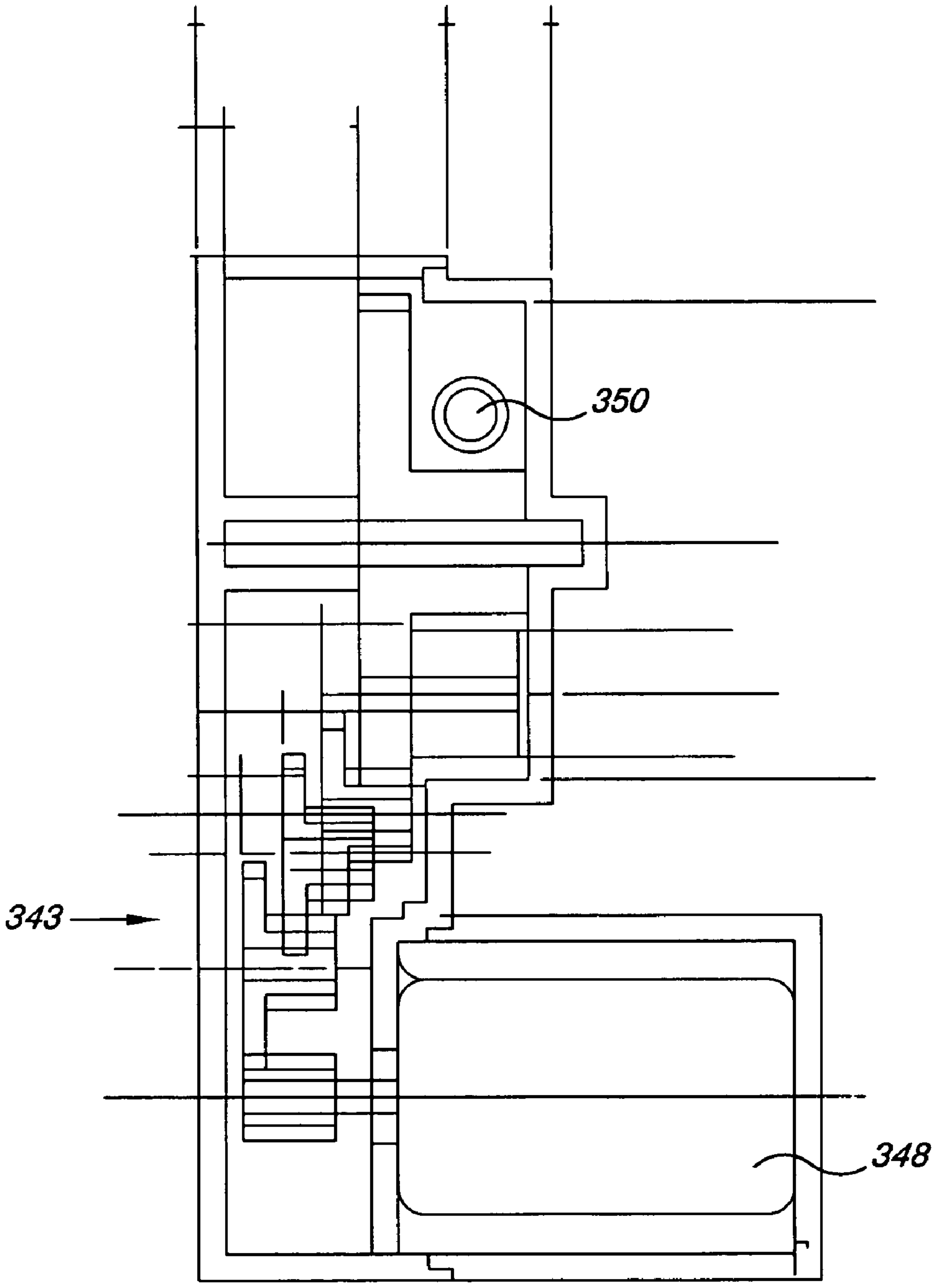
FIG. 24 is another side view of the embodiment of FIG. 22.

FIGS. 20 and 21 depict an embodiment of the sprayer of the present invention, wherein the sprayer 3 is operably coupled to, but remote from, separate, or not directly connected to the container 4 of material to be dispensed. As shown in FIG. 21, this embodiment comprises a nozzle 300, stopper valve 302, nozzle 304, valve case 306, gear 308, seal 310 (and other seals and washers as needed), gear box 312, gears 314, 316, 317. As further shown in FIG. 20, this embodiment comprises a generally pistol-shaped sprayer or spray head 3, comprising a housing 320 formed by housing halves and containing or mounting the components referenced in FIG. 21. The spray head further comprises, a PCB 322, a conduit 324, battery housing 326 with suitable battery contacts 328 and an actuator comprising a trigger 330 and trigger switch 332. The conduit 324 operably connects the spray head to a container 334 through a cap 336. The container may be any suitable distance from the spray head and may be carried separately from the spray head. The spray head may have a storage position in which it is detachably connected to a container, as by a hook and loop connector.

It should be appreciated that any embodiment of the spray head 3 in accordance with the present invention could be disposable. That is, any spray head or assembly 3 could be adapted to carry non-replaceable alkaline batteries, for example in a suitable location such as in the head or the handle. Thus, for example, a disposable spray head could be purchased, coupled to a container and disposed of when the container is empty.

FIGS. 22-26 depict an embodiment of a pump suitable for use with the sprayer of the present invention, more particularly, a peristaltic-type pump. Referring to FIG. 25*a*, generally, the depicted pump includes a pump housing shell 340, including formed by appropriate housing portions or shells. One or the other part of the housings or shells carries suitable axes or pins 342, which in turn carry a gear and roller assembly 343, comprising rollers 344 and gears 346. Any number of rollers, for example 3, driven by any number of gears could be used. A suitable size motor 348 is incorporated with the pump housing or suitably mounted adjacent the pump housing in the spray head. A flexible plastic tube 350 made out of a suitable material such as silicon extends from the container to the nozzle 352 thereby forming a fluid pathway operably incorporating the peristaltic pump. In use, the rollers 344, driven by the gears 346 periodically and repeatedly compressed the flexible tube 350 to send a pulse or surge of the substance to be dispensed through the tube and out the nozzle. The pump embodiment of FIGS. 22-26 may be actuated by a suitable trigger mechanism 354, and it may have a safety lock 356. A suitable motor is a FA-130RA-2270 motor, but any suitable motor might be used. The gear ratio of the depicted gear arrangement is 30:1, but that may be varied as required. As in any of the embodiments of the present invention, it should be understood that the motor can be positioned as selected relative to the gear assembly. In other words, a suitable motor can be directly or indirectly coupled to provide the desired motive or drive effect.

Figure 25:
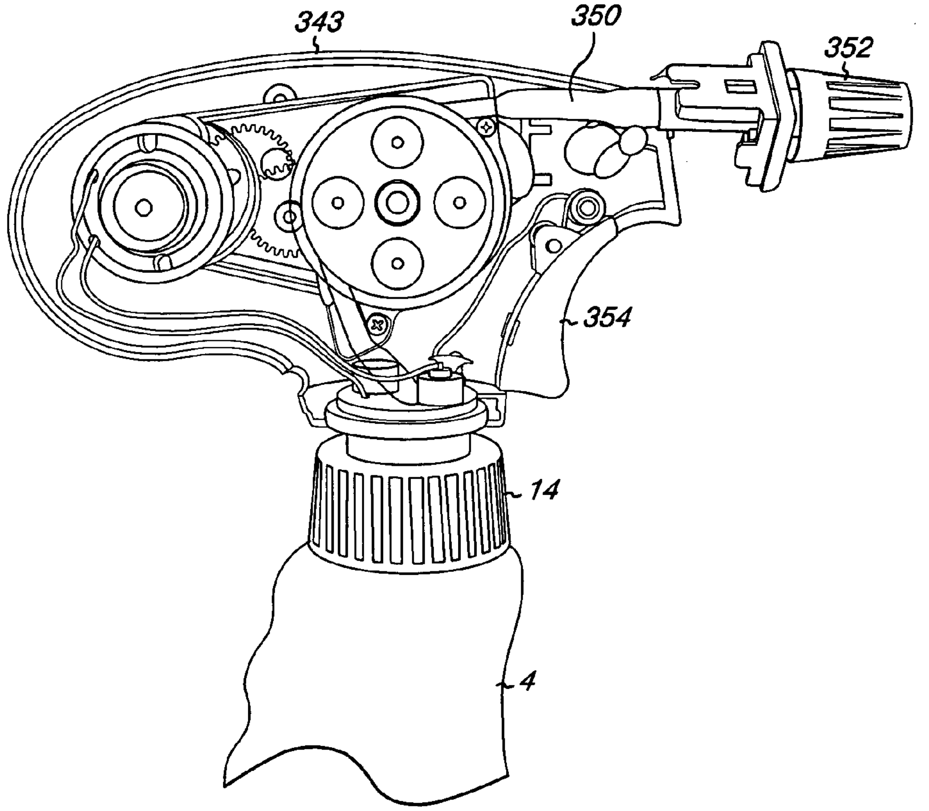
FIG. 25 is a side view of an exemplary prototype of the present invention in accordance with the embodiment of FIG. 22.
Figure 26:
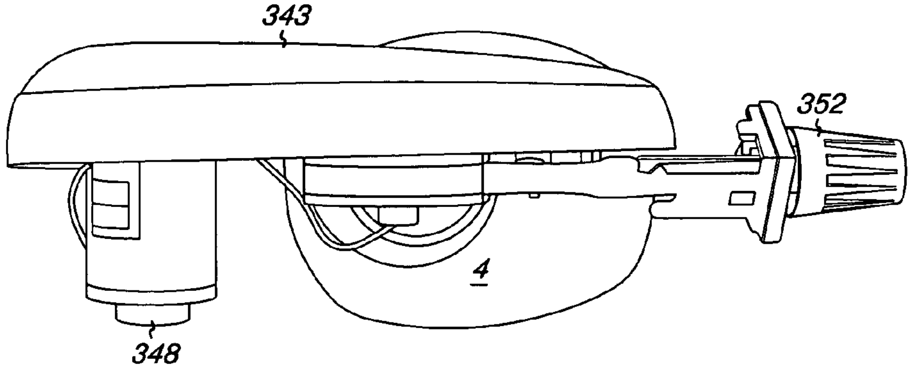
FIG. 26 is a view of an exemplary prototype of the present invention in accordance with the embodiment of FIG. 25.
Figure 25A:
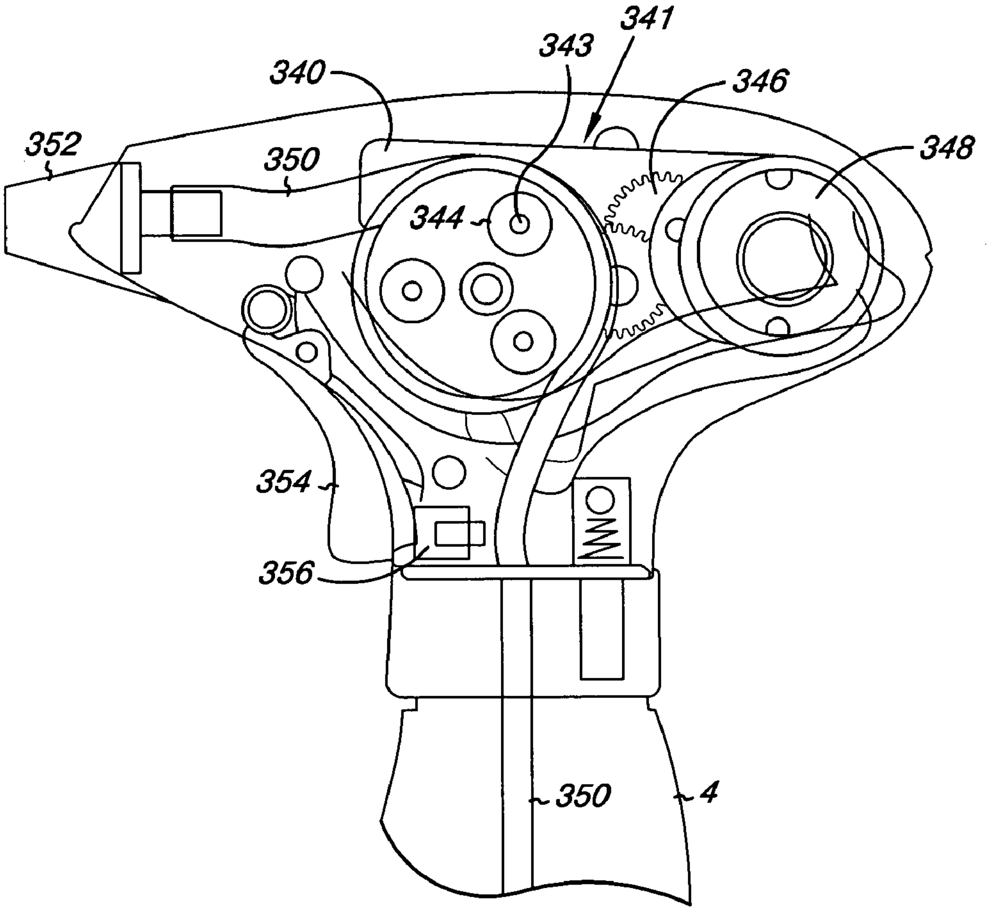
FIG. 25*a* is a representational side view of the embodiment of FIG. 25.

FIGS. 25 and 26 depict an exemplary prototype of the sprayer of the present invention comprising a peristaltic pump, and depict how the compressible conduit 350 passes through the pump unit from the container 4 to the nozzle 8.

Any of the embodiments of the powered sprayer of the present invention may be provided with a suitable dispense characteristic adjustment nozzle. Such nozzles include standard-type spray, stream, adjustable nozzles which provide for a stream of the substance to be dispensed, e.g., a nozzle with straight channels inside the nozzle cap to produce a high velocity narrow stream. For spray or mist characteristics, the nozzle may be adapted by having, for example, suitable grooves in a spiral to impart spin and turbulence. Such a nozzle can produce a plume or cloud of the product to be dispensed in fine, medium and coarse characteristics. Fine spray would correspond to a highly atomized mist, medium to an atomized spray and coarse to a spray or rough stream.

The nozzle 8 for the present invention may be available in a spray only configuration, or it could be available in a foaming nozzle arrangement wherein air intakes allow air to be introduced into the stream of material passing through the nozzle either in a stream or spray pattern. This air introduction creates turbulence to mix air and the fluid to be dispensed for foaming action. Any of the nozzle could be adapted to accommodate attachments, working ends or tools for specific purposes, e.g., scrubbing, polishing, disinfecting, etc.

In another embodiment, the nozzle may comprise a "infinity" spray to stream adjustable nozzle. This type of adjustable nozzle is well known to those skilled in the art and includes or is exemplified by screw-type nozzles with a full range of stream and spray patterns. Any of the nozzle embodiments may include a snap fit, removable cap rinsing or cleaning the cap and/or the nozzle.

The components which are integrated to form the present invention, including the outer shells and components which contact substances to be dispensed may be made of any suitable material. For example, the flexible tube could be made of silicon. Polyethylene or stainless steel are other exemplary materials which have good resistance to organic solvents, acids and bases and other chemicals which could be applied using the present invention.

Figure 28:
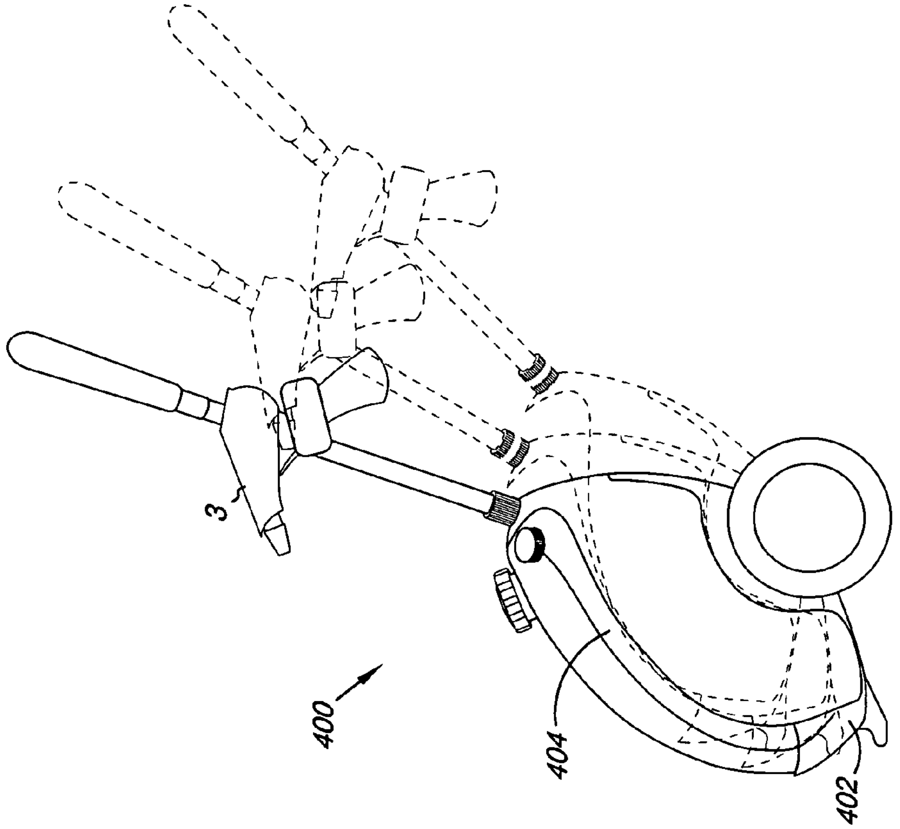
FIG. 28 is a side view of the embodiment of FIG. 27, depicting several operational or use positions.
Figure 27:
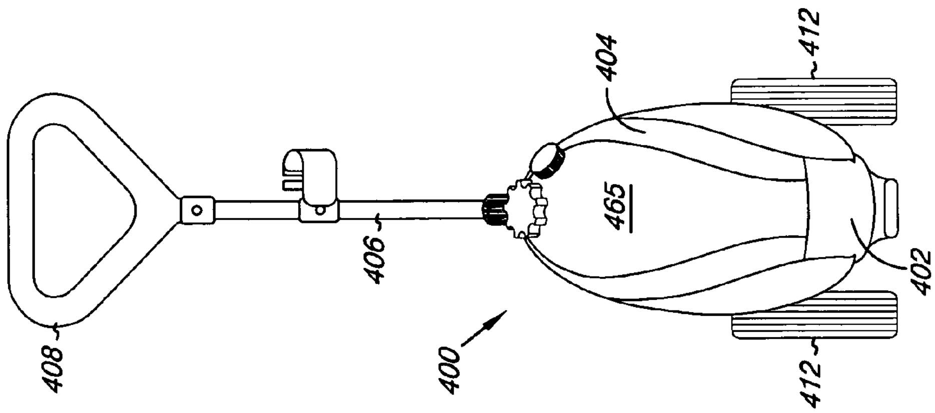
FIG. 27 is a front view depicting another embodiment of the present invention.
Figure 29:
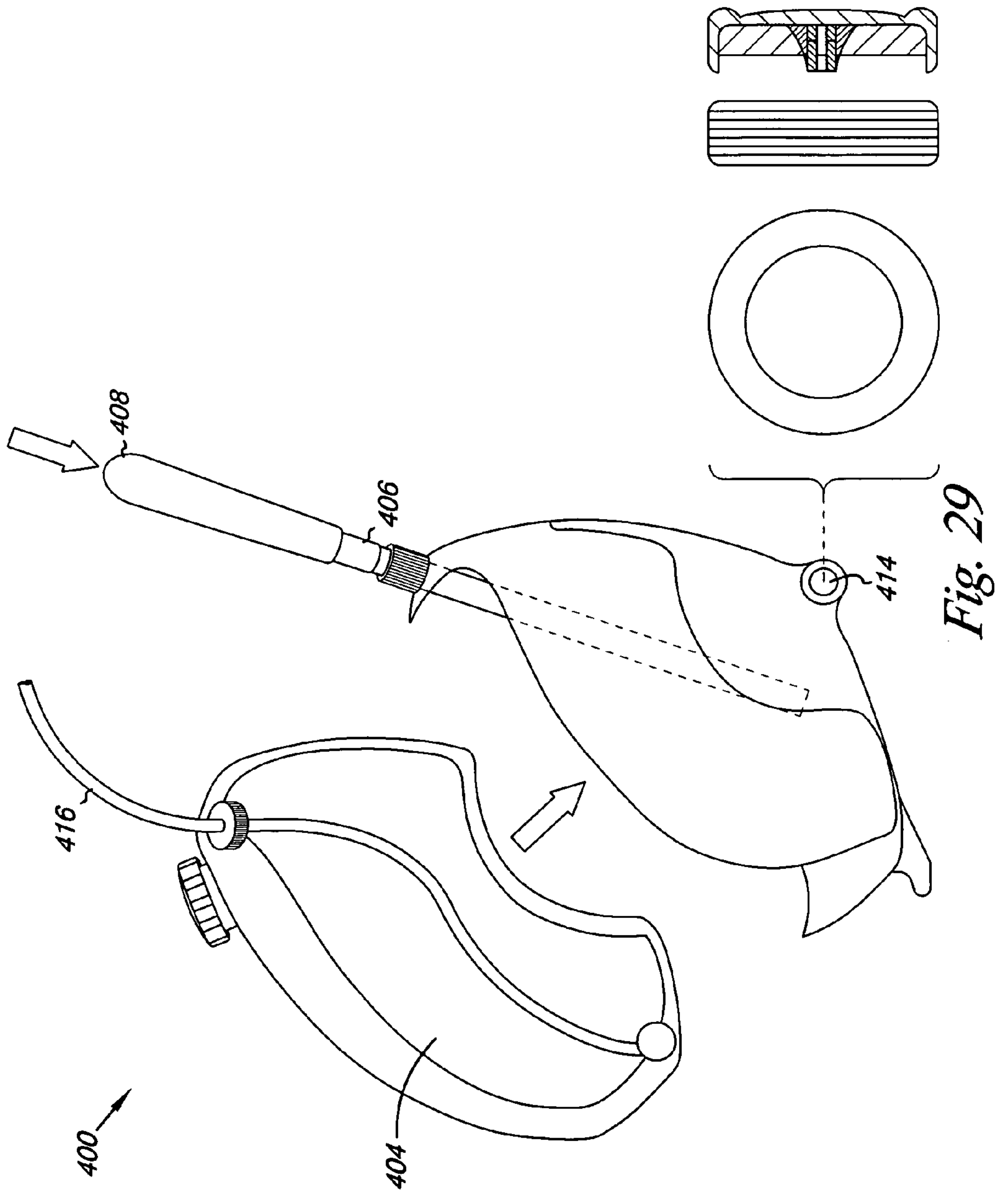
FIG. 29 is an assembly view of the embodiment of FIG. 27.

In one embodiment, the present invention can comprise a caddy (which also may be called a carrier, cart, barrow or the like) designed to be integrated with and/or used with the power sprayer of the present invention. FIGS. 27-30 disclose and depict exemplary caddies for use in and around the home, garden, shop or garage. As shown in FIGS. 27-29, the caddy 400 comprises a body, a tank 404, and a telescoping handle 406 attached to the body and provided with a comfort grip. The tank, which can be attached and detached from the body, or which can be formed integrally with the body, includes a transparent portion 405 for monitoring contents level. The handle or the body may carry a holster 410 for carrying a spray head 3. The caddy includes a pair of wheels 412 which may be of the snap fit non-lube bearing-type wheels connected by a steel axle 414. A hose 416 is operably coupled to the tank at one end and to the spray head 3 at the other end. The spray head 3 depicted in FIG. 28 can incorporate any pump and/or any of the features described above with respect to the present invention and, in some embodiments, can comprise a high output gear turbine pump. In one embodiment, this type of pump comprises an high speed motor and a high output fluid gear pump which can create a continuous stream of fluid up to 14 ft., or in a 25 ft. radius. The components of the caddy may be formed of appropriate materials, for example, various suitable plastics may be used such as for the molded portions, such include plastics commonly known as "PP", "PVC", "PVDF", or "PBT" resins suitable soft tubing may be made out of FCR, nitrile-PVC blend or other PVC-based materials. Suitable silicon or other type O-rings may be provided for seals. Generally, any material with properties useful for use with certain material to be dispensed, liquid or fluid, may be integrated as components or the present invention.

In one embodiment, the caddy incorporates a power sprayer. The sprayer may be operated or powered by a suitable pump, including gear, piston or peristaltic pumps. Any suitable motor and/or gear or power transfer arrangement may be used to drive the selected type of pump. In some embodiments, the pump, pump drive, conduit and nozzle features may be tuned together for optimum performance. As described above, the nozzle itself may be a single dispense mode nozzle, an adjustable spray nozzle, a foaming nozzle, or an infinitely adjustable nozzle.

Figure 30:
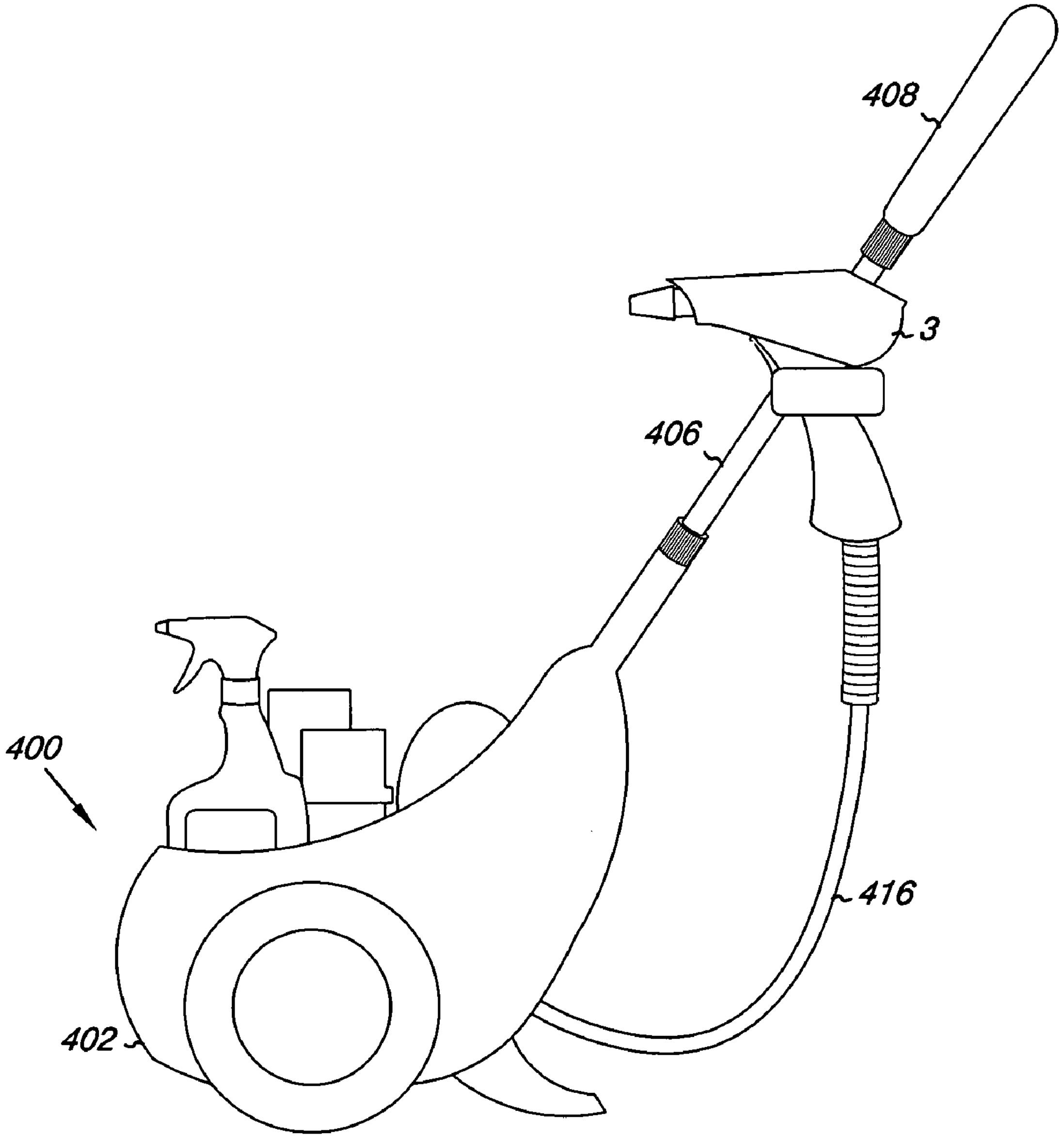
FIG. 30 depicts another embodiment of the present invention.

FIG. 30 depicts an embodiment of the caddy, incorporating the power sprayer of the present invention. This embodiment comprises a body 402 with a tray-like container accommodating feature, one or more spray heads 3, and suitable hoses or conduits (which may be part of the sprayer head(s) 3). The body may be molded or otherwise suitably formed. Two pistol-type power sprayers 3 may be provided, as well as two separate containers or two separate areas within the body for accommodating containers, as well as other items such as wash mitts, chamois, etc. In this way, one of the sprayers 3 may be used for spraying a window cleaner or vinyl protectant, and the other sprayer may be used to spray waxes, tire dressing, bug cleaners, soap, etc. Each power sprayer may be provided with an independent power source as described above (e.g., a battery or batteries as shown in FIG. 20) and are coupled to the container of material to be dispensed by a suitable conduit or tube.

Again, components of the present invention may be formed from any suitable material, including plastics, vinyls, resins, metals, alloys, adhesives and other suitable materials, and suitable forming or manufacturing and assembly processes may be used.

Although the present invention has been described with reference to preferred embodiments, persons skilled in the art will recognize that changes may be made in form and detail without departing from the spirit and scope of the invention.

We claim:

1. A dispensing apparatus comprising:

a dispensing head comprising a pump having an intake and output, a motor for driving the pump, a trigger adapted to control the motor, a nozzle in fluid communication with the output of the pump, and a venting arrangement including a first vent and a second vent associated with the pump, said first vent in fluid communication with the pump and adapted to allow air into the pump and said second vent, generally opposite to the first vent, in fluid communication with a fluid tank and the pump, the second vent adapted to allow air and excess fluid from the pump into the fluid tank;

a battery carried by the dispensing head and electrically coupled to the motor, wherein said battery is generally adjacent to the motor; and a caddy comprising a body, a container having the fluid tank, handle, wheels and a conduit in fluid communication with the container and the intake of the pump.

2. The dispensing apparatus according to claim 1, wherein said container is integrally carried by the body.

3. The dispensing apparatus according to claim 2, wherein said tank comprises a generally transparent portion.

4. The dispensing apparatus according to claim 3, wherein the conduit comprises a hose attached at a first hose end to the tank and at a second hose end to the dispensing head.

5. The dispensing apparatus according to claim 1, wherein the handle is adapted to detachably carry the dispensing head.

6. The dispensing apparatus according to claim 1, wherein said container is detachably carried by the body and has a generally transparent portion.

7. The dispensing apparatus according to claim 1, wherein the body integrally comprises the container and an area for receiving items.

8. The dispensing apparatus according to claim 7, wherein the area for receiving items comprises a bottom surface and one or more side surfaces connected to entirely surround the items, wherein the items can be set upright on the bottom surface and retained, on all sides of the items, within the one or more side surfaces.

9. The dispensing apparatus according to claim 1, wherein the dispensing head further comprises a lock having a first and second position, the first position allowing the trigger to be actuated and the second position preventing the trigger from being actuated.

* * * * *